US012570887B2

(12) United States Patent
Shanmugam et al.

(10) Patent No.: US 12,570,887 B2
(45) **Date of Patent: *Mar. 10, 2026**

(54) ULTRA-HIGH MOLECULAR WEIGHT (UHMW) BRANCHED BLOCK COPOLYMER VISCOSIFIER FOR WATER BASED DRILLING FLUIDS

(71) Applicant: SAUDI ARABIAN OIL COMPANY, Dhahran (SA)

(72) Inventors: Sivaprakash Shanmugam, Houston, TX (US); Ashok Santra, The Woodlands, TX (US); Carl J. Thaemlitz, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,235

(22) Filed: May 29, 2024

(65) Prior Publication Data

US 2024/0309260 A1 Sep. 19, 2024

Related U.S. Application Data

(62) Division of application No. 17/649,998, filed on Feb. 4, 2022, now Pat. No. 12,043,787.

(60) Provisional application No. 63/145,571, filed on Feb. 4, 2021.

(51) Int. Cl.
*C09K 8/035* (2006.01)

(52) U.S. Cl.
CPC .................................... *C09K 8/035* (2013.01)

(58) Field of Classification Search
CPC . C09K 8/035; C09K 8/12; C09K 8/22; C09K 8/24; C09K 8/575; C09K 8/5751; C09K 8/5753; C09K 8/5755; C09K 8/5756; C09K 8/68; C09K 8/685; C09K 8/86; C09K 8/88; C09K 8/882; C09K 8/885; C09K 8/887
See application file for complete search history.

(56) References Cited

U.S. PATENT DOCUMENTS

2011/0286957 A1* 11/2011 Prieve ................. C08F 293/005 435/375
2016/0206750 A1* 7/2016 Monahan ............. A61K 47/549

FOREIGN PATENT DOCUMENTS

CN 110724515 A * 1/2020 ............... C09K 8/80

* cited by examiner

*Primary Examiner* — Aiqun Li
(74) *Attorney, Agent, or Firm* — Osha Bergman Watanabe & Burton LLP

(57) ABSTRACT

A drilling fluid composition comprising a base fluid, and a viscosifier including an ultra-high molecular weight branched block copolymer having the following structure,

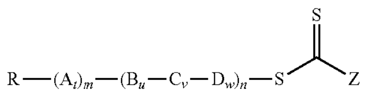

where monomer A is an anionic monomer, monomer B is a hydrophilic monomer, monomer C is an anionic monomer, monomer D is a crosslinker-divinyl monomer, and -SSCZ ground being a terminal RAFT agent.

9 Claims, 6 Drawing Sheets

ULTRA-HIGH MOLECULAR WEIGHT (UHMW) BRANCHED BLOCK COPOLYMER VISCOSIFIER FOR WATER BASED DRILLING FLUIDS

CROSS-REFERENCE TO RELATED APPLICATIONS

This application is a divisional application of U.S. application Ser. No. 17/649,998 filed on Feb. 4, 2022. application Ser. No. 17/649,998 claims the benefit of U.S. Provisional Application No. 63/145,571 filed on Feb. 4, 2021. The entire contents of these applications are incorporated herein by reference in their entirety.

FIELD OF THE DISCLOSURE

Embodiments of the present disclosure generally relate to drilling fluid compositions for drilling oil wells. In particular, the present disclosure relates to drilling fluid compositions including ultra-high molecular weight polymeric viscosifiers.

BACKGROUND

During drilling operations, a drilling fluid, which may also be referred to as drilling mud, is circulated through the wellbore to cool the drill bit, to convey rock cuttings to the surface, or to support the wellbore against collapse of the wellbore and against intrusion of fluids from the formation, among other purposes. Drilling fluids are formulated to have certain fluid characteristics, such as density and rheology, for example, that allow the drilling fluid to perform these functions. However, under certain extreme downhole conditions, such as excessive temperature, for example, some of the properties of the drilling fluid may be altered. For example, the drilling fluid may thicken, increase in viscosity, or form a gel. In other instances, various polymers may break down at extreme downhole temperatures. These changes in properties of the drilling fluid can lead to problems such as solids settling, stuck pipes, fluid loss, and/or excessive pump pressure. Drillers counteract these issues by adding additives to the drilling fluid.

One additive that may be used is a viscosifier. Viscosifiers modify the rheology of a drilling fluid, increasing the viscosity of the drilling fluid, often improving suspension of solids and emulsion stability. For example, a viscosifier may be added to the drilling fluid to impart non-Newtonian fluid rheology to the drilling fluid composition. Such properties may facilitate lifting and conveying rock cuttings to the surface of the wellbore.

SUMMARY OF THE CLAIMED EMBODIMENTS

In one aspect, embodiments disclosed herein relate to a method of drilling a subterranean well. The method including operating a drill in a wellbore in the presence of a drilling fluid composition having a base fluid, and a branched multi-block polymer viscosifier having the following structure,

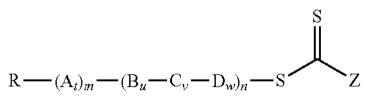

where "Z" is selected from the group consisting of a hydrogen, chlorine, sulfur, oxygen, a substituted or unsubstituted alkyl or substituted or unsubstituted aryl radical, a substituted or unsubstituted heterocycle, a substituted or unsubstituted alkylthio radical, a substituted or unsubstituted arylthio radical, a substituted or unsubstituted alkylselenium radical, a substituted or unsubstituted arylselenium radical, a substituted or unsubstituted alkoxy radical, a substituted or unsubstituted aryloxy radical, a substituted or unsubstituted amino radical, a substituted or unsubstituted hydrazine radical, a substituted or unsubstituted alkoxycarbonyl radical, a substituted or unsubstituted aryloxycarbonyl radical, a substituted or unsubstituted acycloxy or carboxyl radical, a substituted or unsubstituted aroyloxy radical, a substituted or unsubstituted carbamoyl radical, a cyano radical, a dialkyl- or diarylphosphonato radical, a dialkyl-phosphinato or diaryl-phosphinato radical, or a polymer chain; "R'" is a substituted or unsubstituted alkyl, a substituted or unsubstituted acyl, a substituted or unsubstituted aryl, a substituted or unsubstituted aralkyl, a substituted or unsubstituted alkenyl or a substituted or unsubstituted alkynyl group; a saturated or unsaturated aromatic, a substituted or unsubstituted carbocycle or a substituted or unsubstituted heterocycle or a polymer chain, where the polymer chain is hydrophilic; "A" is selected from the group consisting of (meth)acrylate monomer units carrying a COOH or COO— group, fumaric acid or monoethylenically unsaturated C4-C10 and C4-C6 dicarboxylic acid monoesters, ((meth)acrylate/(meth)acrylamide) units having phosphate, phosphonate or phosphinate groups, and sulfonic acid or sulfonate functional group; "B" is selected from the group consisting of (meth)acrylate monomer units carrying a COOH or COO— group, unsaturated C4-C10 and C4-C6 dicarboxylic acid monoesters, ((meth)acrylate/(meth)acrylamide) units having phosphate, phosphonate or phosphinate groups, sulfonic acid or sulfonate functional group; "C" is selected from the group consisting of acrylamide, meth(acrylate) and meth(acrylamide) monomers with ammonium groups, meth(acrylate) and meth(acrylamide) with C20-C30 alkane diols or poly(ethylene glycol), 2-chloroethyl(meth) acrylate, tetrahydrofurfuryl acrylate, vinylacetamide, vinylpyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, and N-vinyl-7-ethyl-2-caprolactam; "D" is selected from the group consisting of vinyl aromatic, (meth)acrylate, and (meth) acrylamide crosslinkers; "t" is from 3-500 units, "u", "v", and "w" are from 3-260000 units, and "m" and "n" are from 1-10 units.

In another aspect, embodiments disclosed herein relate to a drilling fluid composition having a base fluid, and a branched multi-block polymer viscosifier having the following structure,

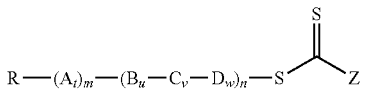

where "Z" is selected from the group consisting of a hydrogen, chlorine, sulfur, oxygen, a substituted or unsubstituted alkyl or substituted or unsubstituted aryl radical, a substituted or unsubstituted heterocycle, a substituted or unsubstituted alkylthio radical, a substituted or unsubstituted arylthio radical, a substituted or unsubstituted alkylselenium radical, a substituted or unsubstituted arylselenium radical, a substituted or unsubstituted alkoxy radical, a substituted or unsubstituted aryloxy radical, a substituted or unsubstituted amino radical, a substituted or unsubstituted hydrazine radical, a substituted or unsubstituted alkoxycarbonyl radical, a substituted or unsubstituted aryloxycarbonyl radical, a substituted or unsubstituted acycloxy or carboxyl radical, a substituted or unsubstituted aroyloxy radical, a substituted or unsubstituted carbamoyl radical, a cyano radical, a dialkyl- or diarylphosphonato radical, a dialkyl-phosphinato or diaryl-phosphinato radical, or a polymer chain; "R" is a substituted or unsubstituted alkyl, a substituted or unsubstituted acyl, a substituted or unsubstituted aryl, a substituted or unsubstituted aralkyl, a substituted or unsubstituted alkenyl or a substituted or unsubstituted alkynyl group; a saturated or unsaturated aromatic, a substituted or unsubstituted carbocycle or a substituted or unsubstituted heterocycle or a polymer chain, where the polymer chain is hydrophilic; "A" is selected from the group consisting of (meth)acrylate monomer units carrying a COOH or COO— group, fumaric acid or monoethylenically unsaturated C4-C10 and C4-C6 dicarboxylic acid monoesters, ((meth)acrylate/(meth)acrylamide) units having phosphate, phosphonate or phosphinate groups, and sulfonic acid or sulfonate functional group; "B" is selected from the group consisting of (meth)acrylate monomer units carrying a COOH or COO— group, unsaturated C4-C10 and C4-C6 dicarboxylic acid monoesters, ((meth)acrylate/(meth)acrylamide) units having phosphate, phosphonate or phosphinate groups, sulfonic acid or sulfonate functional group; "C" is selected from the group consisting of acrylamide, meth(acrylate) and meth(acrylamide) monomers with ammonium groups, meth(acrylate) and meth(acrylamide) with C20-C30 alkane diols or poly(ethylene glycol), 2-chloroethyl(meth)acrylate, tetrahydrofurfuryl acrylate, vinylacetamide, vinylpyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, and N-vinyl-7-ethyl-2-caprolactam; "D" being selected from the group consisting of vinyl aromatic, (meth)acrylate, and (meth)acrylamide crosslinkers; "t" is from 3-500 units, "u", "v", and "w" are from 3-260000 units, and "m" and "n" are from 1-10 units.

In another aspect, embodiments disclosed herein relate to a drilling fluid composition having a base fluid, and a branched multi-block polymer viscosifier having the following structure,

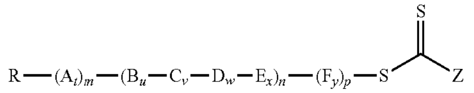

where "Z" is selected from the group consisting of a hydrogen, chlorine, sulfur, oxygen, a substituted or unsubstituted alkyl or substituted or unsubstituted aryl radical, a substituted or unsubstituted heterocycle, a substituted or unsubstituted alkylthio radical, a substituted or unsubstituted arylthio radical, a substituted or unsubstituted alkylselenium radical, a substituted or unsubstituted arylselenium radical, a substituted or unsubstituted alkoxy radical, a substituted or unsubstituted aryloxy radical, a substituted or unsubstituted amino radical, a substituted or unsubstituted hydrazine radical, a substituted or unsubstituted alkoxycarbonyl radical, a substituted or unsubstituted aryloxycarbonyl radical, a substituted or unsubstituted acycloxy or carboxyl radical, a substituted or unsubstituted aroyloxy radical, a substituted or unsubstituted carbamoyl radical, a cyano radical, a dialkyl- or diarylphosphonato radical, a dialkyl-phosphinato or diaryl-phosphinato radical, or a polymer chain; "R'" is a substituted or unsubstituted alkyl, a substituted or unsubstituted acyl, a substituted or unsubstituted aryl, a substituted or unsubstituted aralkyl, a substituted or unsubstituted alkenyl or a substituted or unsubstituted alkynyl group; a saturated or unsaturated aromatic, a substituted or unsubstituted carbocycle or a substituted or unsubstituted heterocycle or a polymer chain, where the polymer chain is hydrophilic; "A" is selected from the group consisting of (meth)acrylate monomer units carrying a COOH or COO— group, fumaric acid or monoethylenically unsaturated C4-C10 and C4-C6 dicarboxylic acid monoesters, ((meth)acrylate/(meth)acrylamide) units having phosphate, phosphonate or phosphinate groups, and sulfonic acid or sulfonate functional group; "B" is selected from the group consisting of (meth)acrylate monomer units carrying a COOH or COO— group, unsaturated C4-C10 and C4-C6 dicarboxylic acid monoesters, ((meth)acrylate/(meth)acrylamide) units having phosphate, phosphonate or phosphinate groups, sulfonic acid or sulfonate functional group; "C" is selected from the group consisting of acrylamide, meth(acrylate) and meth(acrylamide) monomers with ammonium groups, meth(acrylate) and meth(acrylamide) with C20-C30 alkane diols or poly(ethylene glycol), 2-chloroethyl(meth)acrylate, tetrahydrofurfuryl acrylate, vinylacetamide, vinylpyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, and N-vinyl-7-ethyl-2-caprolactam; "D" being selected from the group consisting of vinyl aromatic, (meth)acrylate, and (meth)acrylamide crosslinkers; "E" being selected from the group consisting of alkyl(meth)acrylate monomer having C2-C40-alkyl esters of acrylic acid, C1-C40-alkyl esters of methacrylic acid, vinyl aromatics, and fluorinated alkyl(meth)acrylate units; "F" being any monomer, or combination of monomers for monomers "A"-"E"; "t" is from 3-500 units, "u", "v", and "w" are from 3-260000 units, "x", and "y" are from 0-260000 units, "m" and "n" are from 1-10 units, and "p" is from 0-10 units, where at least one of "x" and "y" are not equal to 0, and when "y" is not equal to 0 "p" is not equal to 0.

Other aspects and advantages will be apparent from the following description and the appended claims.

DETAILED DESCRIPTION

Figure 1:
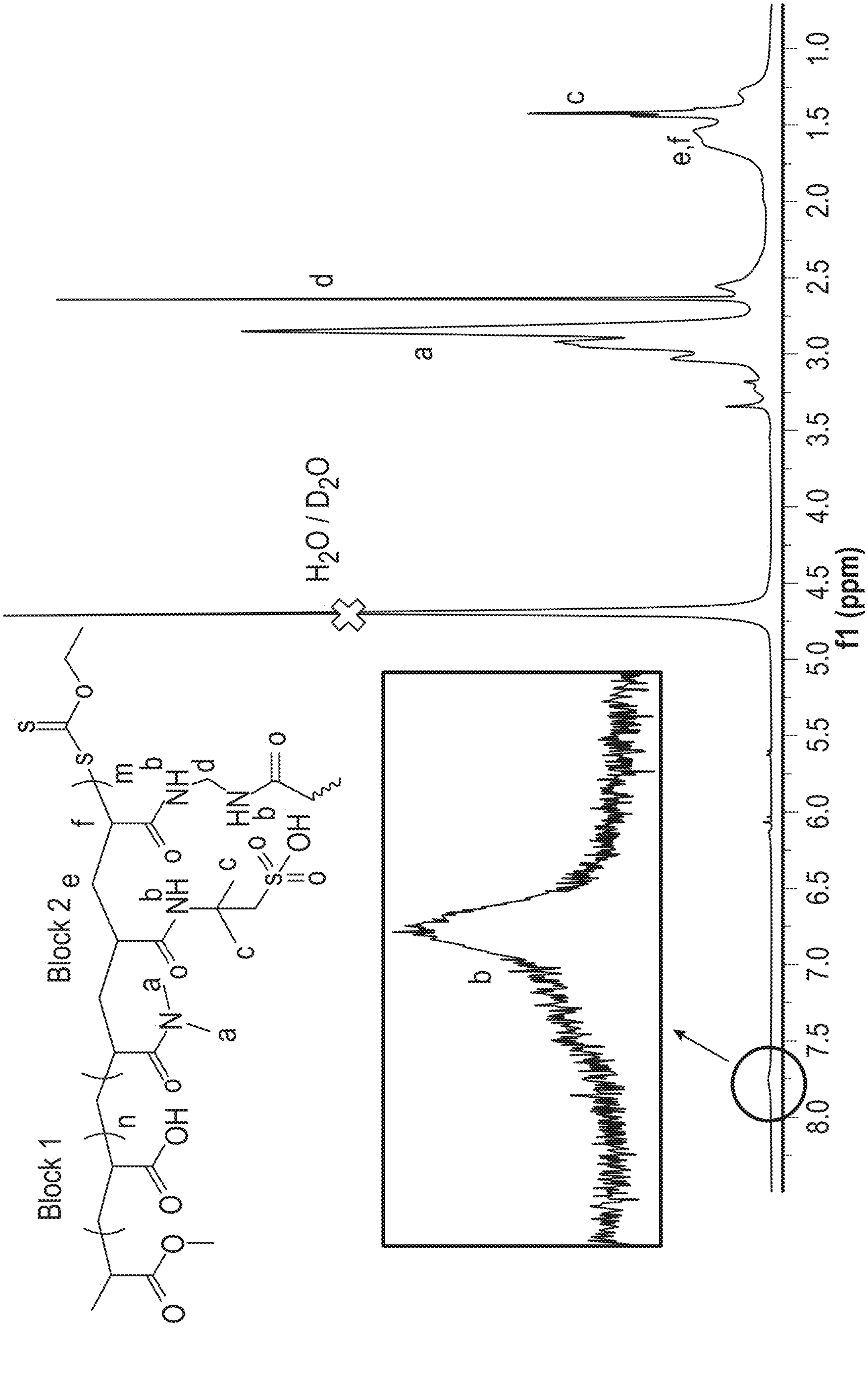
FIG. 1 illustrates an H-NMR graph of the ultra-high molecular weight (UHMW) branched block copolymer according to one or more embodiments disclosed herein.

To drill a subterranean well or wellbore, a drill string including a drill bit and drill collars to weight the drill bit is inserted into a predrilled hole and rotated to cause the drill bit to cut into the rock at the bottom of the hole, producing rock cuttings. To remove the rock cuttings from the bottom of the wellbore, a drilling fluid is pumped down through the drill string to the drill bit. The drilling fluid cools the drill bit and lifts the rock cuttings away from the drill bit. The drilling fluid carries the rock cuttings upwards as the drilling fluid is recirculated back to the surface. At the surface, the rock cuttings are removed from the drilling fluid, and the drilling fluid is then recirculated back down the drill string to the bottom of the wellbore. The term "rock cuttings" is intended to include any fragments, pieces, or particulates separated from the formation by the drill bit or otherwise present in the wellbore.

Under certain extreme downhole conditions, such as excessive temperature or difficult formations, some of the properties of conventional drilling fluids may be altered. For example, interaction of the drilling fluid with a formation having swelling clay and/or excessive solids content or subjecting the drilling fluid to extreme downhole temperatures may cause the conventional drilling fluid to thicken, excessively increase in viscosity, undergo gelation, or any combination of these. In some drilling scenarios, conventional drilling fluids having an increased density and, therefore, increased solids content may enable drilling of a pressurized formation or may be used to control and kill a flowing downhole formation. The increased concentration of solids and increased density of the conventional drilling fluids used in these applications increase the ability of the drilling fluids to support the wellbore and provide enhanced hydrostatic pressure to prevent fluids in the formation from flowing into the wellbore. However, in these challenging scenarios, the increased density and increased solid content of the conventional drilling fluids can lead to problems such as solids settling, stuck pipes, and excessive pump pressure.

The drilling fluid compositions described herein may serve several functions in the drilling process. The drilling fluid compositions provide lubrication and cooling to the drill bit. According to embodiments, the drilling fluid compositions also aid with cleaning the wellbore by transporting rock cuttings from the drill bit to the surface. Additionally, in some embodiments, the drilling fluid compositions provide hydrostatic pressure in the wellbore to provide support to the sidewalls of the wellbore and prevent the sidewalls from collapsing and caving-in on the drill string. In some embodiments, the drilling fluid compositions provide hydrostatic pressure in the wellbore to prevent fluids in the downhole formations from flowing into the wellbore during drilling operations.

High performance water-based drilling fluids provide faster penetration rates, enhanced hole cleaning, greater shale inhibition, and improved wellbore stability. Most water-based drilling fluids only tolerate operating temperatures less than 250° F. because they depend on biopolymer-based viscosifiers. Deeper exploration in extreme high temperature reservoirs (>300° F.) requires new drilling fluid technologies.

The drilling fluid compositions according to embodiments herein include at least a base fluid and one or more additives, any or all of which may change one or more characteristics of the drilling fluid composition. The base fluid may include water, oil (natural or synthetic), or a water/oil emulsion. For drilling fluid compositions that are water-based, the base fluid may be an aqueous base fluid. An aqueous base fluid may be any suitable fluid such as water or a solution containing both water and one or more organic or inorganic compounds dissolved in the water or otherwise completely miscible with the water. For example, in some embodiments, the aqueous base fluid may include at least 50 wt. % water. The aqueous base fluid may include one or more of fresh water, well water, filtered water, distilled water, sea water, salt water, produced water, formation brine, other type of water, or combinations of waters. Alternatively, the drilling fluid compositions may be oil-based and may have a base fluid that is a natural oil or synthetic oil. The base fluid of the drilling fluid composition may also be a water-in-oil emulsion or an invert emulsion. In water-in-oil emulsions and invert emulsions, oil is a continuous phase and water is dispersed in the continuous oil phase by emulsification so that the drilling fluid does not have a distinct water layer.

In one or more embodiments disclosed herein, the drilling fluid composition may include a viscosifier to impart non-Newtonian fluid rheology to the drilling fluid composition to facilitate lifting and conveying rock cuttings to the surface of the wellbore. Conventional examples of viscosifiers may include, but are not limited to, components such as a xanthan gum polymer such as XC polymer, bentonite, polyacrylamide, polyanionic cellulose, or combinations of these viscosifiers. Xanthan gum polymer known as XC polymer, which is a polysaccharide secreted by the bacteria Xanthomonas Campestris (XC). Drilling fluid compositions that include xanthan gum polymers, for example, may only be useful at temperatures up to 200° F. before the rheological properties become unstable.

Accordingly, in one or more embodiments disclosed herein are new high performance, high temperature branched block copolymer viscosifiers for water-based drilling fluids that are both thermally and rheologically stable at high temperature.

Such viscosifiers may be ultra-high molecular weight (UHMW) branched block copolymers for water based drilling fluids. Unlike current commercial synthetic and natural polymer products, the branched block copolymers according to embodiments herein may be able to achieve high temperature stability (>300° F.) and may provide enhanced rheological properties at reduced polymer loadings.

An example drilling fluid composition may include from 0.01 wt. % to 5.0 wt. % viscosifier based on the total weight of the drilling fluid composition. In other embodiments, drilling fluid composition may optionally include from 0.01 wt. % to 4.5 wt. %, from 0.01 wt. % to 3.0 wt. %, from 0.01 wt. % to 1.0 wt. %, from 0.01 wt. % to 0.5 wt. %, from 0.05 wt. % to 5.0 wt. %, from 0.05 wt. % to 3.0 wt. %, from 0.05 wt. % to 1.0 wt. %, from 0.05 wt. % to 0.5 wt. %, from 0.1 wt. % to 3.0 wt. %, from 0.1 wt. % to 1.0 wt. %, from 0.1 wt. % to 0.3 wt. %, from 0.3 wt. % to 0.7 wt. %, from 0.3 wt. % to 0.5 wt. %, or from 0.5 wt. % to 0.7 wt. % viscosifier, based on the total weight of the drilling fluid composition.

Unless otherwise stated, the weight percent of an additive in the drilling fluid composition is based on the total weight of the drilling fluid composition.

An example drilling fluid composition may include from 0.1 lbm/bbl to 25 lbm/bbl viscosifier based on the total volume of the drilling fluid composition. In other embodiments, the drilling fluid composition may include from 0.1 lbm/bbl to 20 lbm/bbl, from 0.1 lbm/bbl to 15 lbm/bbl, from 0.1 lbm/bbl to 10 lbm/bbl, from 0.1 lbm/bbl to 5 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 10 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 10 lbm/bbl, from 10 lbm/bbl to 25 lbm/bbl, from 10 lbm/bbl to 20 lbm/bbl, from 10 lbm/bbl to 15 lbm/bbl, or from 15 lbm/bbl to 25 lbm/bbl viscosifier, based on the total volume of the drilling fluid composition. In some embodiments, the drilling fluid composition may include from 0.01 wt. % to 3 wt. % bentonite, based on the total weight of the drilling fluid composition.

The UHMW branched block copolymer disclosed herein may be produced by a UV initiated photoiniferter approach for synthesis of polymers. This photoiniferter approach is a slight variation of a typical photopolymerization approach as it may afford two important features to polymer/viscosifier synthesis. First, unlike typical photopolymerization or thermal polymerization processes for viscosifier synthesis, the photoiniferter approach may not require the use of initiators to initiate the polymerization. Second, the absence of initiators may afford the growth of ultra-long chains which produce ultra-high molecular weight polymers. Such polymers may be branch-blocked, random-blocked, di-blocked, random-di-blocked, random-branch-blocked, etc. The synthesis may be carried out in one vessel with environmentally friendly solvents such as water and alcohols (such as ethanol, isopropanol, etc.).

The UHMW branched block copolymer may be composed of water soluble monomers with charged and uncharged functionalities with molecular weights ranging from several thousand to several million g/mol.

The UHMW polymer may be synthesized under controlled, or "living" radical polymerization technique, such as Reversible Addition-Fragmentation chain Transfer polymerization (RAFT). In addition, it may be possible to achieve molecular weights up to millions of Dalton (g/mol) using a photoiniferter approach via UV polymerization in combination with RAFT polymerization. In such an approach, a short chain of polyacrylic acid having a chain length of 5-500 units, for example, may be initially synthesized in a first step under a mild UV irradiation in a solvent, such as in water/ethanol mixture over a reaction time of about 10-60 minutes, for example. Upon reaching near complete monomer conversions (~97%), additional water and DMA, AMPS, and MBA monomers may be added. Irradiation under the same UV source may be carried out for a reaction time, which may be about 30 minutes to 120 minutes, for example, to achieve near complete monomer conversions. The overall synthesis of the branched block copolymer may therefore be accomplished in a one pot, two step approach with near quantitative yields (>95%). The overall synthesis may be carried out via a green approach where UV light and green solvents, such as ethanol and water, are employed. The final product may then be directly applied into drilling fluid formulations without any need for polymer purification.

For such polymerization techniques, the general structure of a RAFT agent is:

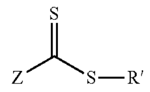

where Z may be a hydrogen atom, a chlorine atom, a sulfur atom, an oxygen atom, an optionally substituted alkyl or optionally substituted aryl radical, an optionally substituted heterocycle, an optionally substituted alkylthio radical, an optionally substituted arylthio radical, an optionally substituted alkylselenium radical, an optionally substituted arylselenium radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted acycloxy or carboxyl radical, an optionally substituted aroyloxy radical, an optionally substituted carbamoyl radical, a cyano radical, a dialkyl- or diarylphosphonato radical, a dialkyl-phosphinato or diaryl-phosphinato radical, or a polymer chain; and R' may be an optionally substituted alkyl, an optionally substituted acyl, an optionally substituted aryl, an optionally substituted aralkyl, an optionally substituted alkenyl or an optionally substituted alkynyl group; a saturated or unsaturated aromatic, an optionally substituted carbocycle or an optionally substituted heterocycle or a polymer chain, where the polymer chain may be hydrophilic.

The R' or Z groups, when they are substituted, can be substituted by optionally substituted phenyl groups, optionally substituted aromatic groups, saturated or unsaturated carbocycles, saturated or unsaturated heterocycles, or one or more selected from the group consisting of alkoxycarbonyl or aryloxycarbonyl (—COOR), carboxyl (—COOH), acyloxy (—$O_2CR$), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, perfluoroalkyl $C_nF_{2n+1}$, allyl, epoxy, alkoxy (—OR), S-alkyl, S-aryl, Se-alkyl, Se-aryl groups exhibiting a hydrophilic or ionic nature, such as alkali metal salts of carboxylic acids, alkali metal salts of sulfonic acids, polyalkylene oxide (PEO, PPO) chains, and cationic substituents (quaternary ammonium salts), where R may be an alkyl or aryl group, or a polymer chain.

The RAFT agents may include sulfur, nitrogen, oxygen, selenium, phosphorus, or combinations thereof. In one or more embodiments, the RAFT agent may include sulfur and one or more of the group consisting of nitrogen, oxygen, selenium, and phosphorus. Without intending to be bound by theory, the RAFT agents may be a xanthate and include sulfur to ensure chemical stability at temperatures greater than or equal to 100° C., greater than or equal to 120° C., greater than or equal to 140° C., or greater than or equal to 150° C.

The resulting branched block copolymer may, in one or more embodiments, be composed of a branched multi-block co-polymer. A general structure of branched multi-block copolymers disclosed herein is illustrated below.

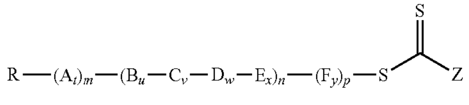

The multi-block polymers herein may include a first block-$(A_t)_m$-, a second block —$(B_u$-$C_v$-$D_w$-$E_x)_n$-, and an optional third block-$(F_y)_p$-. Each of these block segments may be a homopolymer, a block copolymer segment, or may be a random copolymer segment. In general, monomer A may be an anionic monomer, monomer B may be a hydrophilic monomer, monomer C may be an anionic monomer, monomer D may be a crosslinker-divinyl monomer, and monomers E may be an additional, optional, hydrophobic monomer that may be included, if needed. The addition of monomer E may help increase the viscosifying effects through hydrophobic associations of functional pendant groups on the monomer. Monomer F of the optional third block is further defined below.

With respect to the above described monomers, t may be from 3-500 units, u, v, and w may be from 3-260000 units, x and y may be from 0-260000 units, m and n may be from 1-10 units, and p may be from 0-10 units, all based on a per RAFT agent basis. For such UHMW branched polymers, there may be from 1-10 RAFT agents per polymer. It should be noted that y and p are inclusive. If y is 0, then p must also be 0. Only in cases where monomer F is used (y>0) will there be p number of blocks with monomer F. For example, when x is not equal to 0, x may be from 1-260000 units, when y is not equal to 0, y may be from 1-260000 units, and when p is not equal to 0, p may be from 1-10 units. Further, in one or more embodiments, at least one of x and y is not equal to 0.

For example, a list of possible monomers is detailed below. This is a non-exhaustive list, and other similarly functional monomers may be included.

Monomer A

Monomer "A" may be (meth)acrylate monomer units carrying a COOH or COO— group, fumaric acid or mono-ethylenically unsaturated C4-C10 and C4-C6 dicarboxylic acid monoesters, ((meth)acrylate/(meth)acrylamide) units having phosphate, phosphonate or phosphinate groups, and sulfonic acid or sulfonate functional group.

Monomer B (anionic monomer), monomer C (hydrophilic monomer), monomer D (crosslinker), and monomer E (additional hydrophobic monomer)

Monomer "B" may be (meth)acrylate monomer units carrying a COOH or COO— group, unsaturated C4-C10 and C4-C6 dicarboxylic acid monoesters, ((meth)acrylate/(meth)acrylamide) units having phosphate, phosphonate or phosphinate groups, sulfonic acid or sulfonate functional group.

Monomer "C" may be acrylamide, meth(acrylate) and meth(acrylamide) monomers with ammonium groups, meth(acrylate) and meth(acrylamide) with C20-C30 alkane diols or poly(ethylene glycol), 2-chloroethyl(meth)acrylate, tetrahydrofurfuryl acrylate, vinylacetamide, vinylpyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, and N-vinyl-7-ethyl-2-caprolactam.

Monomer "D" may be vinyl aromatic, (meth)acrylate, and (meth)acrylamide crosslinkers.

Monomer "E" may be alkyl(meth)acrylate monomer having C2-C40-alkyl esters of acrylic acid, C1-C40-alkyl esters of methacrylic acid, vinyl aromatics, and fluorinated alkyl (meth)acrylates units.

Monomer "F" may be any monomer, or combination of monomers from monomers "A"-"E" as defined above.

With respect to the function groups of monomers "A"-"F" the COOH or COO— group may be acrylic acid, methacrylic acid, ethacrylic acid, α-chloroacrylic acid, crotonic acid, maleic acid, itaconic acid, citraconic acid, mesaconic acid, glutaconic acid, or aconitic acid.

In one or more embodiments, the fumaric acid or mono-ethylenically unsaturated C4-C10 and C4-C6 dicarboxylic acid monoesters may be monomethyl maleate.

Further, in one or more embodiments, the ((meth)acrylate/(meth)acrylamide) units having phosphate, phosphonate or phosphinate groups may be 2-acrylamido-ethylphosphonic acid (AEPA), monoacryloyloxyethyl phosphate or bis(2-methacryloyloxyethyl)phosphate units, vinylphosphonic acid, allylphosphonic acid, isopropylphosphonic acid, or diallylaminomethylene phosphonate and their salts.

Further, in one or more embodiments, the sulfonic acid or sulfonate functional group may be 3-sulfopropyl(meth)acrylate, 2-propene-1-sulfonic acid, sodium-1-allyloxy-2 hydroxypropylsulfonate (COPS1), 2-acrylamido-2-methyl-propanesulfonic acid (AMPS), (meth)allyl sulfonate, sodium vinylsulfonate, ort sodium styrenesulfonate.

Further, in one or more embodiments, the acrylamide may be N,N-(Dimethyl acrylamide) (DMA), (meth)acrylamide, morpholine N-oxide acrylamide, N,N-dimethyl(meth)acrylamide, N,N-diethylacrylamide, (meth)acrylamide, N-isopropyl (meth)acrylamide, N-tert-butyl(meth)acrylamide, and diacetone acrylamide, meth(acrylate) and meth(acrylamide) monomers with ammonium groups such as N,N-dimethylaminomethyl (meth)acrylate, N,N-dimethylaminoethyl (meth)acrylate, N,N-diethylaminoethyl (meth) acrylate, N,N-dimethylaminopropyl (meth)acrylate, N,N-diethylaminopropyl (meth)acrylate and N,N-dimethylaminocyclohexyl (meth)acrylate; N-[2-(dimethylamino)ethyl](meth)acrylamide, N-[3-(dimethylamino) propyl](meth)acrylamide, N-[4-(dimethylamino)butyl](meth)acrylamide, N-[2-(diethylamino) ethyl](meth)acrylamide, and N-[4-(dimethylamino)cyclohexyl](meth)acrylamide, [2-((Meth) acryloyloxy)ethyl]trimethylammonium chloride, N-(3-Sulfopropyl)-N-(meth)acroyloxyethyl-N, N-dimethylammonium betaine, N-(3-sulfopropyl)-N-methacroylamidepropyl-N, N-dimethylammonium betaine, N-(3-carboxymethyl)-N-methacroylamidepropyl-N, N-dimethylammonium betaine, N-carboxymethyl-N-methacroyloxyethyl-N,N dimethylammonium betaine, and meth(acrylate) and meth(acrylamide) with C20-C30 alkane diols or poly(ethylene glycol) monomer such as 2-hydroxyethyl(meth)acrylate, 2-hydroxypropyl(meth)acrylate, 3-hydroxypropyl(meth)acrylate, 3-hydroxybutyl(meth)acrylate, 4-hydroxybutyl(meth)acrylate, 6-hydroxyhexyl(meth)acrylate, 3-hydroxy-2-ethylhexyl(meth)acrylate, N-(hydroxymethyl)acrylamide, N-(2-hydroxypropyl)methacrylamide, N-hydroxyethylacrylamide, N-[tris(hydroxymethyl) methacrylamide, 4-acryloylmorpholine, 2-N-morpholinoethyl methacrylate, (meth)acrylate of polyethylene glycol, (meth) acrylate of diethylene glycol, ethylene glycol methyl ether (meth)acrylate, poly(propylene glycol) acrylate, 2-chloroethyl(meth)acrylate, or tetrahydrofurfuryl acrylate.

Further, in one or more embodiments, the vinyl aromatic, (meth)acrylate, and (meth)acrylamide crosslinkers may be N,N-methylenebisacrylamide, bis(2-methacryloyl)oxyethyl disulfide, 1,4-Bis(4-vinylphenoxy)butane, divinyl benzene, ethylene glycol di(meth)acrylate, diethylene glycol di(meth) acrylate, tetra(ethylene glycol) diacrylate triethylene glycol dimethacrylate, poly(ethylene glycol) di(meth)acrylate with a number average molecular weight of Mn=250-20000 g/mol, neopentyl glycol diacrylate, neopentyl glycol propoxylate diacrylate, or tri(propylene glycol) diacrylate.

Further, in one or more embodiments, the alkyl(meth) acrylate monomer having C2-C40-alkyl esters of acrylic acid, C1-C40-alkyl esters of methacrylic acid, vinyl aromatics, and fluorinated alkyl(meth)acrylates may be methyl (meth)acrylate, ethyl(meth)acrylate, N-propyl(meth)acrylate, isopropyl(meth)acrylate, N-butyl(meth)acrylate, isobutyl(meth)acrylate, tert-butyl(meth)acrylate, pentyl (meth)acrylate, octyl(meth)acrylate, lauryl(meth)acrylate, N-hexyl(meth)acrylate, N-heptyl(meth)acrylate, N-2-ethylhexyl(meth)acrylate, decyl(meth)acrylate, palmityl(meth) acrylate, stearyl(meth)acrylate, hydrenol(meth)acrylate, behenyl(meth)acrylate, polyisobutene(meth)acrylate, or phenoxyethyl(meth)acrylate.

Finally, in one or more embodiments, the vinyl aromatic units may be styrene, phenyl(meth)acrylate, benzyl(meth) acrylate, 4-acetoxystyrene, 4-bromostyrene, 2,4-dimethylstyrene, 2,5-dimethylstyrene, 3,5-dimethylstyrene, 4-ethoxystyrene, 4-tert-butystyrene, 2-chlorostyrene, 3-chlorostyrene, 4-chlorostyrene, 4-ethoxystyrene, 4-fluorostyrene, 2,6-dichlorostyrene, 4-methoxystyrene, methylstyrene, 3-methylstyrene, and 4-methylstyrene, 2,4,6-trimethylstyrene.

Monomer F

Additionally, monomer F, when this monomer is needed or desired, may be any monomer, or combination of monomers as listed for monomers A-E. Monomer F may further increase the average molecular weight of the polymer.

Accordingly, the ultra-high molecular weight (UHMW) branched polymer disclosed above may have one end block ("B1") comprising an anionic monomer such as a (meth) acrylate monomer unit carrying a COOH or COO-, phosphate, phosphonate or phosphinate, and sulfonic acid or sulfonate functional groups, with average molecular weight between 500 to 60,000 g/mol. B1 of ultra-high molecular weight (UHMW) branched polymer disclosed above may be chain extended with monomers B, C, and D to form a second block ("B2"), with the option of adding monomer E. Further, a divinyl crosslinker monomer D may allow branching. The average molecular weight of B2 may be between 0.5 and 25 million g/mol.

In embodiments where more than B1 and B2 are desired, the subsequent blocks may have monomer functionalities similar to B1 and B2. For example, monomer F may be added, or additional blocks B1 and B2 may be used. Despite having more than two blocks, the average molecular weight of all the multiblocks (B2-Bh) with branching of chains after the first block may be 0.5 to 25 million g/mol. In one or more embodiments, "h" may be 3, 4, 5, 6, 7, 8, 9, 10, or higher.

As examples of a di-block or multi-block configurations, the UHMW branched polymer may have a configuration such as: B1-B2, B1-B2-B3, B1-B2-B1, B1-B2-B1-B2, B1-B2-Bh, or (B1-B2)j, where "h" may be 3, 4, 5, 6, 7, 8, 9, 10, or higher, and "j" may be 1, 2, 3, 4, 5, 6, 7, 8, 9, 10, or higher.

An example of one such UHMW branched block copolymer as described above may be illustrated below.

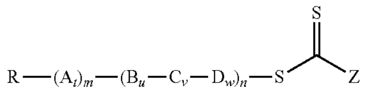

In this embodiment, R, Z, and monomers A-D may be defined the same as above. Without being bound by theory, in one example monomer A may be acrylic acid, monomer B may be N,N-Dimethylacrylamide (DMA), monomer C May 2-acrylamido-2-methylpropanesulfonic acid (AMPS), and monomer D may methylene bisacrylamide (MBA). This may be generalized as (poly(acrylic acidi)-block-poly ($DMA_u$-co-$AMPS_v$-co-$MBA_w$)), where t=5-500 units u: 3-260000 units v: 3-121000 units w: 3-100 units.

with m, u, v, w being based on a single RAFT agent. The final UHMW branched block copolymer being made of between 1 and 10 RAFT agent (i.e., m and n are 1-10).

One such UHMW branched block copolymer as described above may be synthesized as illustrated below.

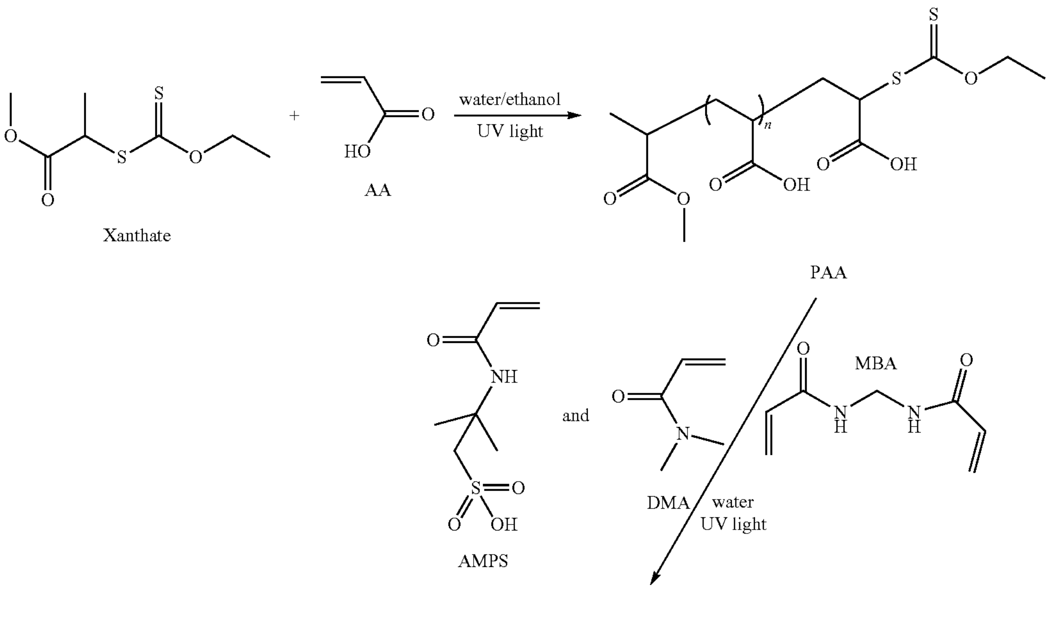

-continued

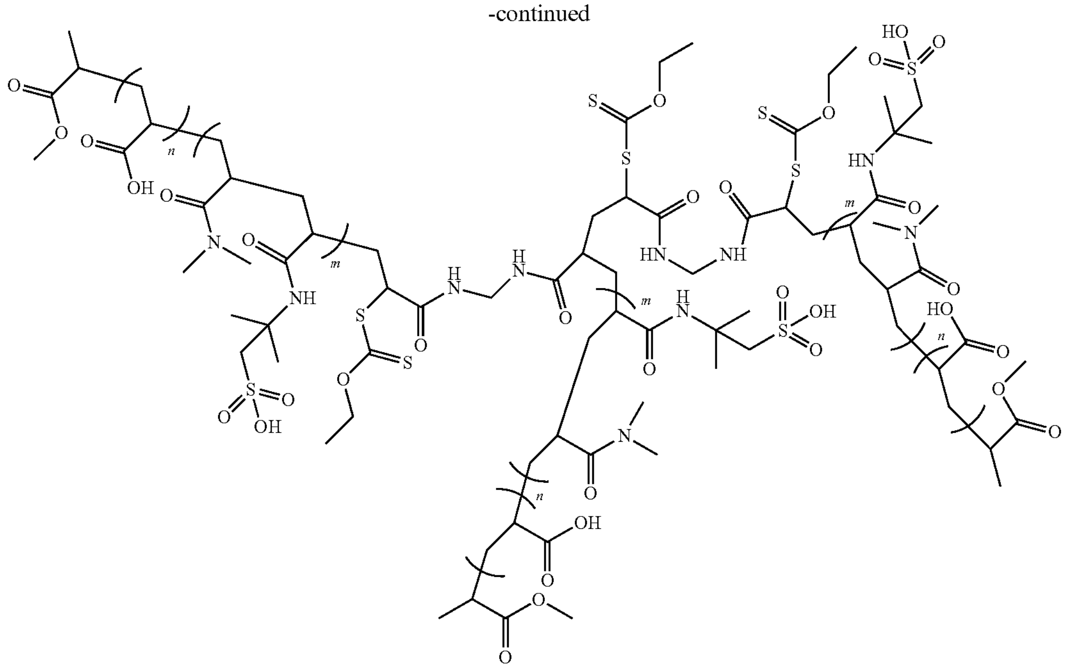

Additionally, in one or more embodiments, branched block copolymer synthesis with RAFT photoiniferter polymerization under UV light irradiation may be performed using green solvents, such as ethanol/water.

EXAMPLES

UHMW branched block copolymers, according to embodiments herein, were synthesized and characterized as described below. The overall synthesis of the branched block copolymer was conducted in a one pot, two step approach with near quantitative yields (>95%). A short chain of polyacrylic acid having a chain length of 5-500 units was initially synthesized in a first step under a mild UV irradiation, at 365 nm, 7.2 $mW/cm^2$, in a water/ethanol mixture over a reaction time of about 30 minutes. Upon reaching near complete monomer conversions (~97%), additional water and DMA, AMPS, and MBA monomers were added. Irradiation under the same UV source was carried out for a reaction time of about 1 hour, achieving near complete monomer conversions.

Characterization of UHMW Branch Block Copolymer

The branched block copolymer formed during the reaction was characterized to determine the molecular weight, polymer composition, and temperature stability. To characterize the polymer, a sampling of the reaction was carried out at different time points during the generation of the second block, where a bulk of the molecular weight of the viscosifier is generated. Samples taken at the different time points were analyzed via proton nuclear magnetic resonance ($^1H$ NMR) and size exclusion chromatography with multi angle light scattering (SEC-MALS) to determine the percentage of monomer conversions to polymer, and molecular weight and molecular weight distributions of the polymer samples, respectively. Table 1 indicates that under constant UV irradiation, $^1H$ NMR indicated an increase in monomer consumption to form polymers with time, and near quantitative conversions to polymer was achieved in 1 hour. Further, the SEC MALS data indicated that despite the increase in dispersity of chains over time, the polymer products remain monomodal in nature.

TABLE 1

| Time (min) | Monomer Conversion (%) | Molecular Weight (g/mol) | Polymer Dispersity (Mw/Mn) |
|---|---|---|---|
| 5 | 43 | $4.0 \times 10^6$ | 1.28 |
| 10 | 63 | $5.4 \times 10^6$ | 1.36 |
| 60 | >99 | $9.1 \times 10^6$ | 1.67 |

Near quantitative monomer conversions (>99%) determined via $^1H$ NMR is confirmed through the near complete disappearance of vinyl proton peaks in the region between 5-6 ppm of the NMR spectrum, as illustrated in FIG. 1. In addition, several characteristic peaks of the branched block copolymer are also observed. Polymer molecular weight distribution (polymer dispersity) is an indication of the overall chain length of each polymer chain in the sample, with polymer dispersity of 1 indicating that all chains are equal in length and the polymer dispersity above 1 is an indication of a mixture of polymers with long and short chains. Most synthetic polymers will often have polymer dispersity above 1, thereby forming a Gaussian distribution for chain lengths. In typical free radical polymerization, the polymer dispersity will be above 1 and the SEC-MALS traces will be multimodal in nature. However, the UHMW polymer disclosed herein, despite having a polymer dispersity above 1, exhibits a monomodal nature as determined by the SEC-MALS data (FIG. 4). Consequently, the rheological and mechanical properties of the polymers synthesized via RAFT polymerization will be vastly different from polymers synthesized via free radical polymerization.

Figure 2:
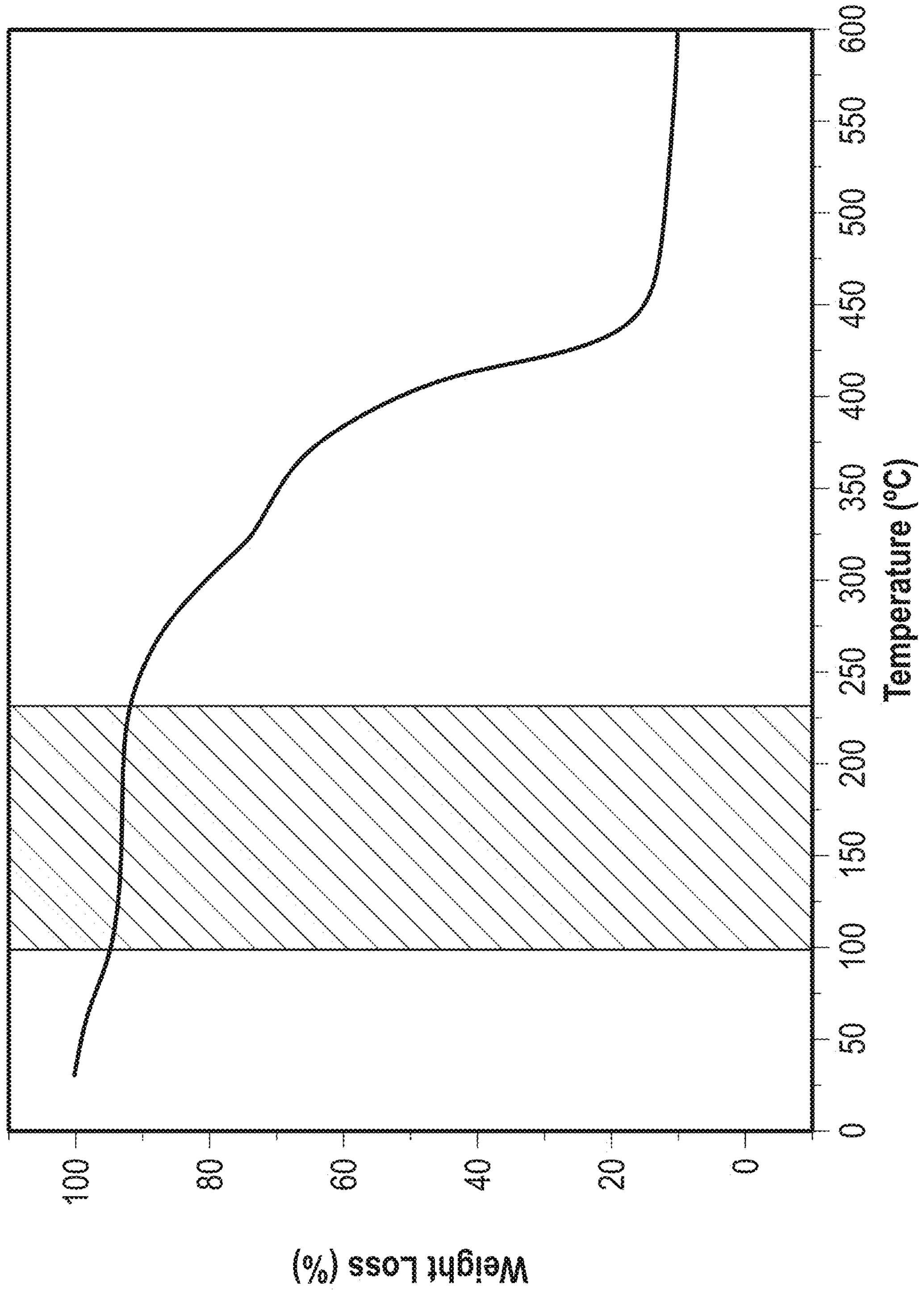
FIG. 2 illustrates the UHMW branched block copolymer weight loss as a function of temperature according to one or more embodiments disclosed herein.

The UHMW branched block copolymer was also characterized using thermogravimetric analysis (TGA). As seen in FIG. 2, a slight decrease in weight from 30°° C. to 100° C. is observed. This weight loss is due to evaporation of water. This is confirmed by the data between 100-230° C., which is above the boiling point of water, which exhibits little to no mass loss in that range.

Table 2 shows a comparison of the branched block copolymer according to embodiments herein with commercial products such as EVOVIS and Xanthan gum. Experimentally, the water based muds were mixed and hot rolled at 300° F. for 16 hours before rheological testing with FANN® Model 35.

TABLE 2

| | Novel Branched Block Copolymer | EVOVIS | Xanthan Gum |
|---|---|---|---|
| Fluid formulations (lb/bbl): | | | |
| Water | 290.5 | 290.5 | 290.5 |
| MgO (pH buffer) | 4.5 | 4.5 | 4.5 |
| KCl | 8 | 8 | 8 |
| PAC-R (Fluid Loss Control) | 0.5 | 0.5 | 0.5 |
| Evovis HT | — | 6.5 | — |
| Xanthan Gum | — | — | 3.5 |
| Branched Block Copolymer | 3.25 | — | — |
| Barathin Plus | 3 | 3 | 3 |
| Barite | 191.9 | 191.9 | 191.9 |
| Density, lb/gal | 12 | 12 | 12 |
| Aging temp., ° F. | 300 | 300 | 300 |
| Aging conditions | rolling | rolling | rolling |
| Aging period, hr | 16 | 16 | 16 |
| pH before aging | 9 | 9 | 10 |
| pH after aging | 7 | 8 | 8 |

Rheological testing of water based muds hot rolled at 300° F. for 16 hours was then carried out for the different viscosifiers at 120° F. (Table 3). It can be seen that the branched block copolymer, according to one or more embodiments disclosed herein, exhibits superior rheological properties compared to natural polymer such as xanthan gum. In addition, for 50 wt % less polymer loading, the branched block copolymer shows superior gel strengths, higher low shear numbers (at 6 and 3 rpms) and higher yield point compared to commercial product such as EVOVIS. In all cases, the branched block copolymer showed no barite settling while EVOVIS and Xanthan gum both showed barite settling.

TABLE 3

| FANN ® Model 35 | Novel Branched Block Copolymer | EVOVIS | Xanthan Gum |
|---|---|---|---|
| Temperature, ° F. | 120 | 120 | 120 |
| 600 rpm | 112 | 110 | 10 |
| 300 rpm | 75 | 70 | 5 |
| 200 rpm | 61 | 54 | 4 |
| 100 rpm | 45 | 31 | 2 |
| 6 rpm | 19 | 3 | 1 |
| 3 rpm | 18 | 2 | 1 |
| 10 sec. gel, lb/100 ft2 | 19 | 3 | 3 |
| 10 min. gel, lb/100 ft2 | 33 | 3 | 5 |
| AV, cP | 56 | 55 | 5 |
| PV, cP | 37 | 40 | 5 |
| YP, lb/100 ft2 | 38 | 30 | 0 |
| Settling Observations | No Barite Settling | Barite Settling | Barite Settling |

The gel strength refers to the shear stress of the drilling fluid composition measured at a low shear rate following a defined period of time during which the drilling fluid composition is maintained in a static state. The shear stress of the drilling fluid composition at low shear rate may be measured using a standard oilfield viscometer, such as a FANN® Model 35 viscometer operated at low rpms, such as at 3 rpm or 6 rpm, according to the test methods described in API Recommended Practice For Field Testing Water-Based Drilling Fluids (RP 13B-1/ISO 10414-1:2002). To measure the gel strength, the drilling fluid composition is first stirred by contacting the drilling fluid composition with the spindle of the viscometer and operating the viscometer at 600 rotations per minute (rpm). The viscometer is then turned off for period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the drilling fluid composition comes to rest in a static state. Upon expiration of the time period, the viscometer is turned back on at a low speed, such as 3 rpm for example, to generate a low shear rate. The viscometer reading is then taken. The gel strength of the drilling fluid composition is reported in units of pounds of force per 100 square feet (lbf/100 $ft^2$).

The rheological behavior of the drilling fluid composition may be determined by measuring the shear stress on the drilling fluid composition at different shear rates, which may be accomplished by measuring the shear stress and/or shear rate on the drilling fluid composition using a FANN® Model 35 viscometer operated at 3 rpm, 6 rpm, 100 rpm, 200 rpm, 300 rpm, or 600 rpm, for example. The rheology of the drilling fluid composition may be evaluated from the plastic viscosity (PV) and the yield point (YP), which are parameters from the Bingham plastic rheology model. The PV is related to the resistance of the drilling fluid composition to flow due to mechanical interaction between the solids of the drilling fluid composition and represents the viscosity of the drilling fluid composition extrapolated to infinite shear rate. The PV reflects the type and concentration of the solids in the drilling fluid composition, and a lesser PV is preferred. The PV of the drilling fluid composition may be estimated by measuring the shear stress of the drilling fluid using a FANN® Model 35 viscometer at spindle speeds of 300 rotations per minute (rpm) and 600 rpm and subtracting the 300 rpm viscosity measurement from the 600 rpm viscosity measurement according to Equation 1, which is subsequently provided. The PV values determined for the drilling fluid compositions are provided in this disclosure in units of centipoise (cP).

$$PV = (\text{viscosity at } 600rpm) - (\text{viscosity at } 300rpm) \quad \text{Equation 1}$$

The YP represents the shear stress below which the drilling fluid composition behaves as a rigid body and above which the drilling fluid composition flows as a viscous fluid. In other words, the YP represents the amount of stress required to move the drilling fluid composition from a static condition. The YP of a drilling fluid composition is correlated with the capacity of the drilling fluid composition to carry rock cuttings through the annulus, which in simplified terms indicates the drilling fluid composition's hole-cleaning ability. YP of equal to or greater than 15 lbf/100 $ft^2$ is considered acceptable for drilling. The YP is determined by extrapolating the Bingham plastic rheology model to a shear rate of zero. The YP of the drilling fluid composition may be estimated from the PV from Equation 1 by subtracting the PV from Equation 1 from the shear stress of the drilling fluid measured at 300 rpm according to Equation 2 provided subsequently.

$$YP = (300rpm \text{ reading}) - PV \quad \text{Equation 2}$$

The YP is expressed as a force per area, such as pounds of force per one hundred square feet (lbf/100 ft2) for example. The methods for measuring and determining PV and YP for the drilling fluid compositions are consistent with methods conventionally used for drilling fluids in general.

Rheological comparisons of the UHMW branched block copolymer, according to one or more embodiments disclosed herein, with three commercially products-liquid partially hydrolyzed polyacrylamide (PHPA), powdered PHPA, and xanthan gum-were carried out to delineate the chemical stability of UHMW branched block copolymer after high temperature hot rolling, similar to the comparison against EVOVIS and Xanthan Gum. These products were mixed in fresh water according to the formulations shown in Table 4. The pH of these solutions was then adjusted with 20 wt % caustic soda and maintained between pH 10-11. Rheological studies with FANN® Model 35 were carried out at 120° F. before (BHR) and after (AHR) hot rolling at 300° F. for 16 hours in a pressure cell.

copolymer. On the other hand, a complete degradation of xanthan gum is observed while the liquid and powdered PHPA underwent a partial degradation. The UHMW branched block copolymer not only enhanced the plastic viscosity and yield point of the fluid at similar loadings when compared to commercial products such as xanthan gum and powdered PHPA, but it also provides a reliable and consistent plastic viscosity and yield point after being subjected to a high temperature aging.

Figure 4B:
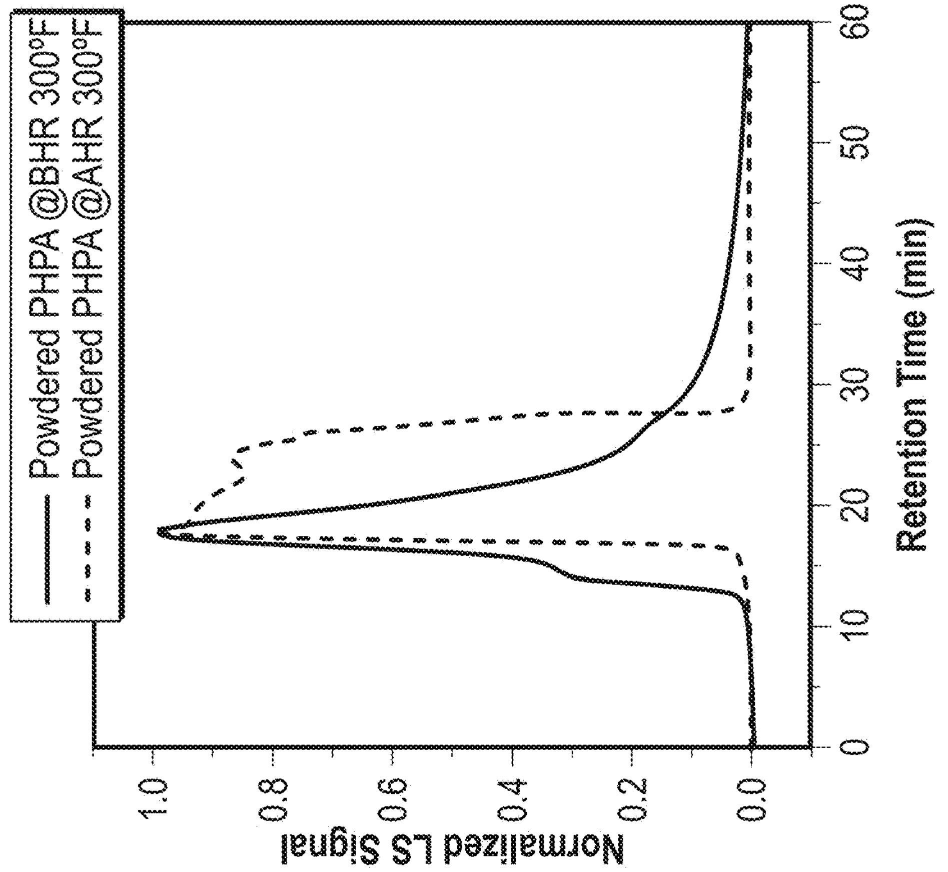
FIGS. 4A and 4B compare molecular weights before and after hot rolling of the UHMW branched block copolymer according to one or more embodiments disclosed herein with those of commercially available viscosifiers.
Figure 4A:
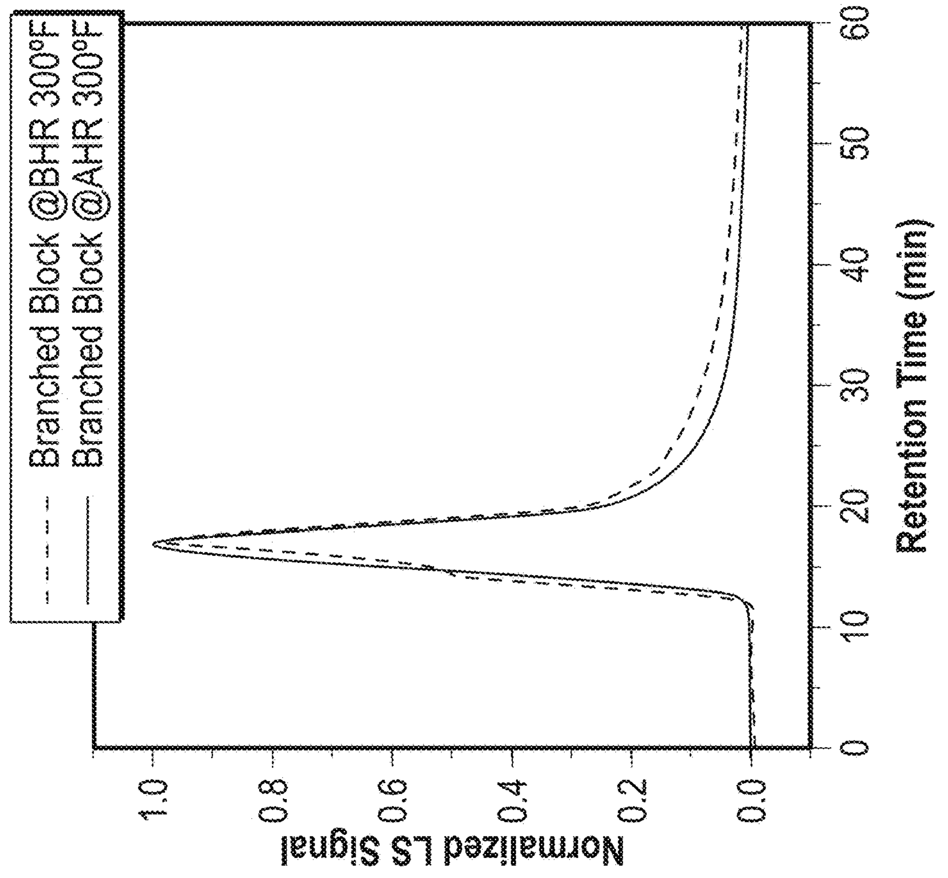

FIGS. 4A and 4B illustrated polymer molecular weight profiles determined by SEC-MALS BHR and AHR at 300° F. for 16 hours in a pressure cell pressurized at 500 psi.

The thermal stability of the branched block copolymer viscosifier and PHPA were determined by analyzing the viscosifiers before and after hot rolling with SEC-MALS. A thermally stable additive should have overlapping polymer molecular weight plots before hot rolling (BHR) and after hot rolling (AHR) at 300° F. As illustrated in FIG. 4A, the UHMW branched block copolymer exhibits stability, as the plots before hot rolling (dashed line) and after hot rolling (solid line) overlap quite well. As illustrated in FIG. 4B, the polymer molecular weight plot for PHPA BHR (solid line) underwent significant changes in terms of its profile AHR (dashed line). The polymer profile of PHPA after hot rolling showed an increase in peaks at later retention time, which signifies chain scission and/or chain hydrolysis.

Further, rheological properties in 3 wt % KCl brine were also studied with the branched block copolymer additive,

TABLE 4

| Fluid Formulations (lb/bbl) | | | | | | | | |
|---|---|---|---|---|---|---|---|---|
| Water | 276.5 | | 276.5 | | 276.5 | | 276.5 | |
| Caustic Soda (20 wt % solution) | 2 | | 2 | | 2 | | 2 | |
| Branched Block Copolymer | 1.625 | | — | | — | | — | |
| Commercial Product: Xanthan gum | — | | 1.625 | | — | | — | |
| Commercial Product: Powdered PHPA | — | | — | | 1.625 | | — | |
| Commercial Product: Liquid PHPA | — | | — | | — | | 4.645 | |
| Fann 35 | | | | | | | | |
| Temperature, ° F. | 120 | | 120 | | 120 | | 120 | |
| Conditions | BHR | AHR | BHR | AHR | BHR | AHR | BHR | AHR |
| 600 rpm | 141 | 130 | 42 | 0 | 36 | 14 | 50 | 23 |
| 300 rpm | 109 | 98 | 34 | 0 | 29 | 8 | 38 | 13 |
| 200 rpm | 91 | 81 | 30 | 0 | 25 | 6 | 32 | 9 |
| 100 rpm | 68 | 59 | 26 | 0 | 20 | 3 | 25 | 5 |
| 6 rpm | 20 | 16 | 16 | 0 | 8 | 0 | 7 | 1 |
| 3 rpm | 15 | 12 | 14 | 0 | 7 | 0 | 5 | 0 |
| 10 sec. gel, lb/100 ft2 | 14 | 12 | 17 | 0 | 8 | 0 | 5 | 0 |
| 10 min. gel, lb/100 ft2 | 15 | 11 | 22 | 0 | 9 | 0 | 6 | 0 |
| PV, cP | 32 | 32 | 8 | 0 | 7 | 6 | 12 | 10 |
| YP, lb/100 ft2 | 77 | 66 | 26 | 0 | 22 | 2 | 26 | 3 |

Figure 3A:
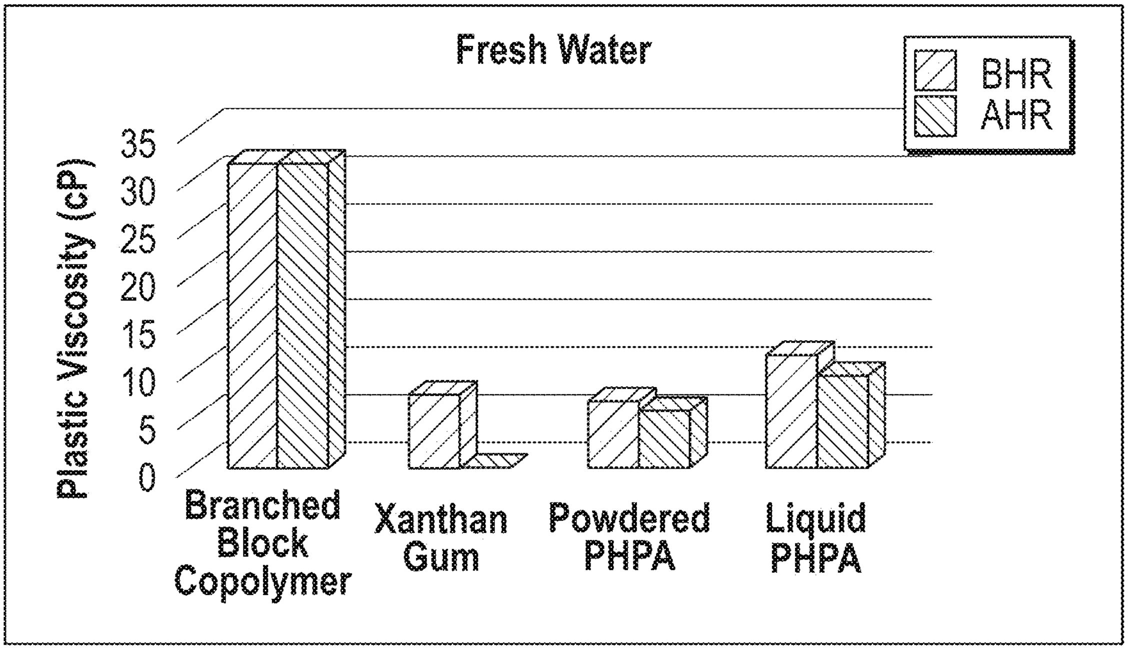
FIGS. 3A and 3B compare rheological properties of the UHMW branched block copolymer according to one or more embodiments disclosed herein with those of commercially available viscosifiers.
Figure 3B:
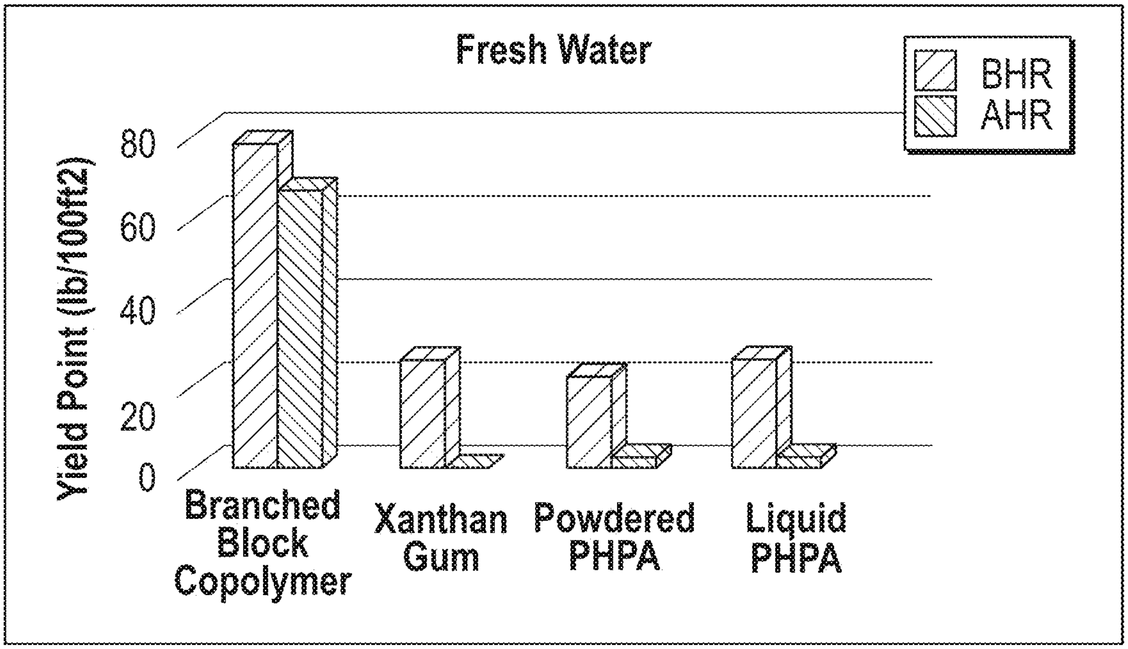

Based on the FANN® Model 35 rheology before hot rolling (BHR) compared to after hot rolling (AHR), the UHMW branched block copolymer provided a much higher plastic viscosity (FIG. 3A) and yield point (FIG. 3B) compared to equal mass of xanthan gum and powdered PHPA in water. A higher loading was required for liquid PHPA in order to match the 600 and 300 rpm dial readings of xanthan gum and powdered PHPA. Upon hot rolling at 300° F. for 16 hours, there were no observable changes in the plastic viscosity and yield point of the UHMW branched block liquid PHPA, and powdered PHPA. These additives were mixed in 3 wt % KCI brine solution according to the formulations shown in Table 5. The pH of these solutions were then adjusted with 20 wt % caustic soda and maintained between pH 10-11. Rheological studies with FANN® Model 35 were carried out at 120° F. before and after hot rolling at 300° F. for 16 hours in a pressure cell.

TABLE 5

| Fluid Formulations (lb/bbl) | | | |
|---|---|---|---|
| Water | 276.5 | 276.5 | 276.5 |
| Caustic Soda (20 wt % solution) | 2 | 2 | 2 |

TABLE 5-continued

| | | | | | | |
|---|---|---|---|---|---|---|
| KCl | 8 | | 8 | | 8 | |
| Branched Block Copolymer | 3.25 | | — | | — | |
| Commercial Product: Powdered PHPA | — | | 3.25 | | — | |
| Commercial Product: Liquid PHPA | — | | — | | 9.295 | |
| Fann 35 | | | | | | |
| Temperature, ° F. | 120 | | 120 | | 120 | |
| Conditions | BHR | AHR | BHR | AHR | BHR | AHR |
| 600 rpm | 92 | 110 | 57 | 25 | 55 | 31 |
| 300 rpm | 62 | 76 | 40 | 14 | 40 | 17 |
| 200 rpm | 48 | 60 | 33 | 10 | 32 | 12 |
| 100 rpm | 32 | 39 | 25 | 6 | 23 | 7 |
| 6 rpm | 7 | 8 | 9 | 2 | 5 | 2 |
| 3 rpm | 5 | 6 | 7 | 1 | 3 | 1 |
| 10 sec. gel, lb/100 ft2 | 5 | 7 | 8 | 2 | 4 | 2 |
| 10 min. gel, lb/100 ft2 | 5 | 7 | 8 | 2 | 4 | 2 |
| PV, cP | 30 | 34 | 17 | 11 | 15 | 14 |
| YP, lb/100 ft2 | 32 | 42 | 23 | 3 | 25 | 3 |

Figure 5A:
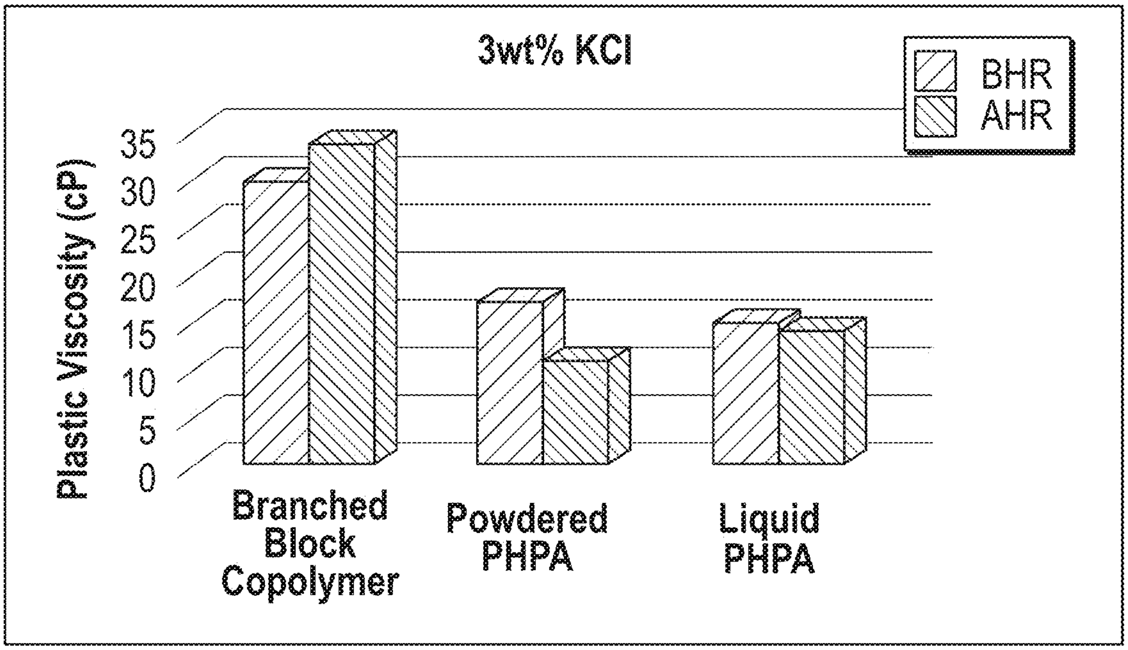
FIGS. 5A and 5B compare rheological properties of the UHMW branched block copolymer according to one or more embodiments disclosed herein with those of commercially available viscosifiers.
Figure 5B:
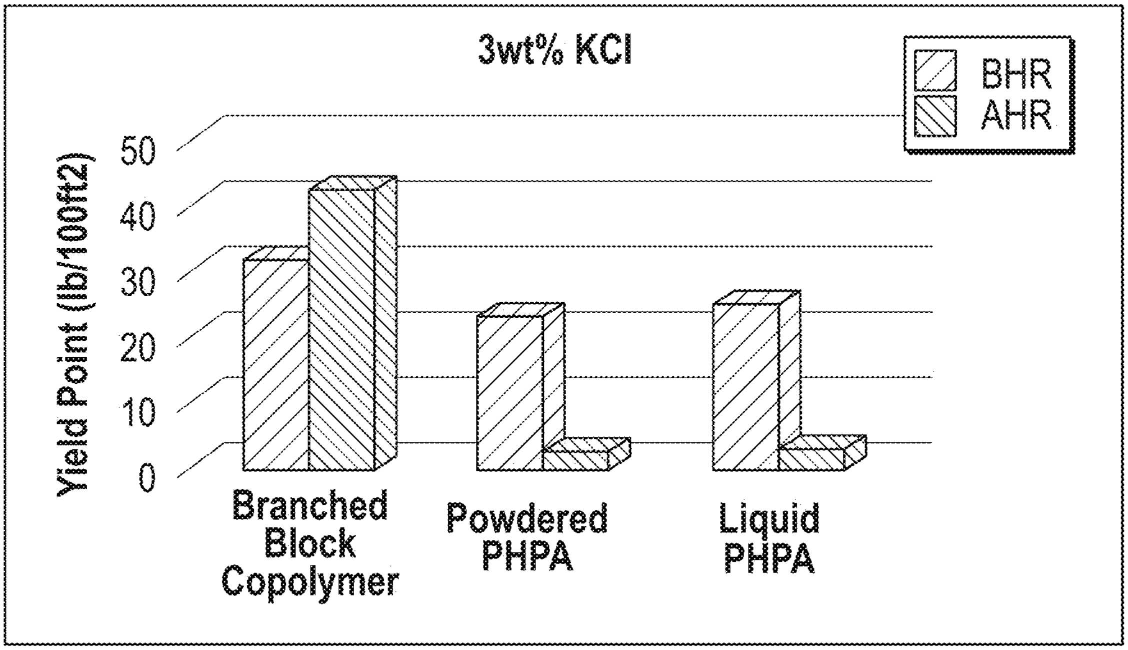

Based on the FANN® Model 35 rheology before hot rolling, the UHMW branched block copolymer provided a much higher plastic viscosity (FIG. 5A) and yield point (FIG. 5B) compared of equal mass of powdered PHPA in brine solution. Upon hot rolling at 300° F. for 16 hours, there were no observable changes in the plastic viscosity and yield point of the UHMW branched block copolymer, while the liquid and powdered PHPA underwent a partial degradation similar to observations made for these additives in fresh water. The UHMW branched block copolymer not only enhanced the plastic viscosity and yield point of the fluid at similar loadings when compared to commercial additive such as powdered PHPA, but it also provided a reliable and consistent plastic viscosity and yield point after being subjected to a high temperature aging under brine conditions.

Figure 6:
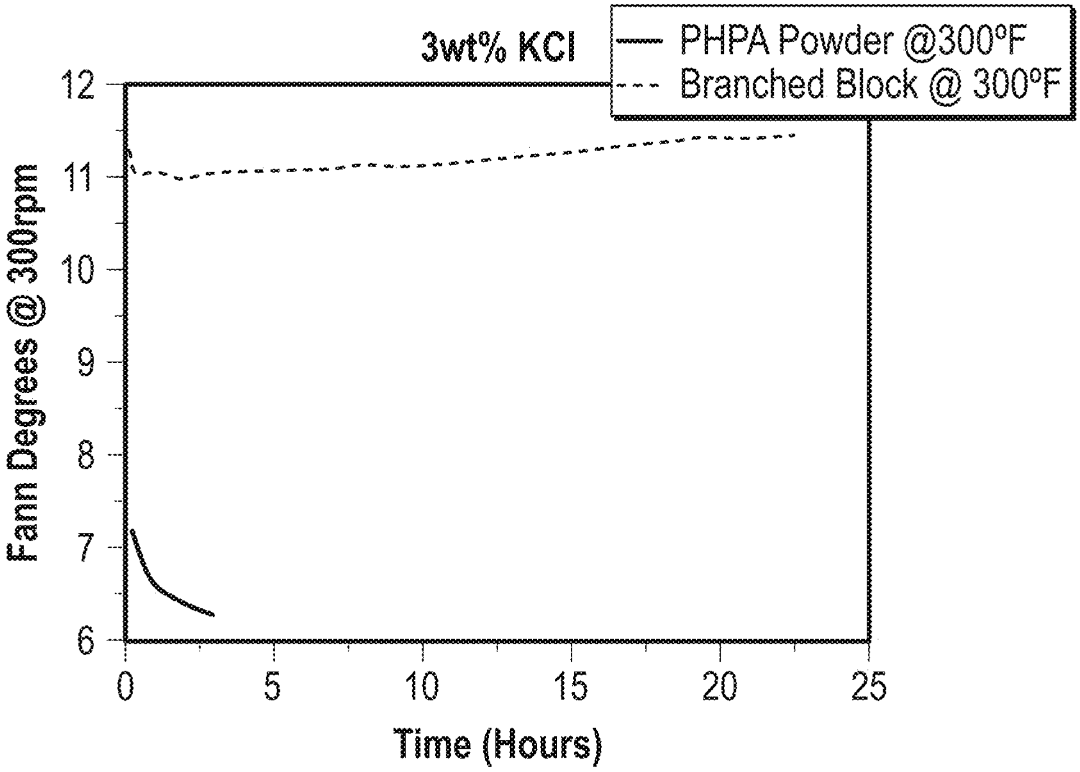
FIG. 6 compares rheological properties of the UHMW branched block copolymer according to one or more embodiments disclosed herein with those of commercially available viscosifiers.

Shear degradation properties of the UHMW branched block copolymer at high temperature and pressure in 3 wt % KCl were also studied with powdered PHPA as a comparison using similar formulations. The results of which are illustrated in FIG. 6, the fluids for this study were prepared by adding the viscosifiers in 3 wt % KCI based on the formulation provided in Table 5, and adjusting the pH with caustic soda to pH 9-10. These fluids were then hot rolled for 16 hours at 120° F. before proceeding to shear testing with FANN® Model 77. The low temperature hot rolling ensured that minimum degradation was seen for powdered PHPA as the rheology before and after aging had very little change. FANN® Model 77 was then used to shear the fluids at 300 rpm at a temperature of 300° F. with confined pressure of 10,000 psia. As seen in FIG. 6, at 300° F., the PHPA powder (solid line) quickly dropped in viscosity, but the UHMW branched block copolymer (dashed line) provided a maintained higher viscosity (seen as a higher dial reading) with minimum degradation.

Figure 7:
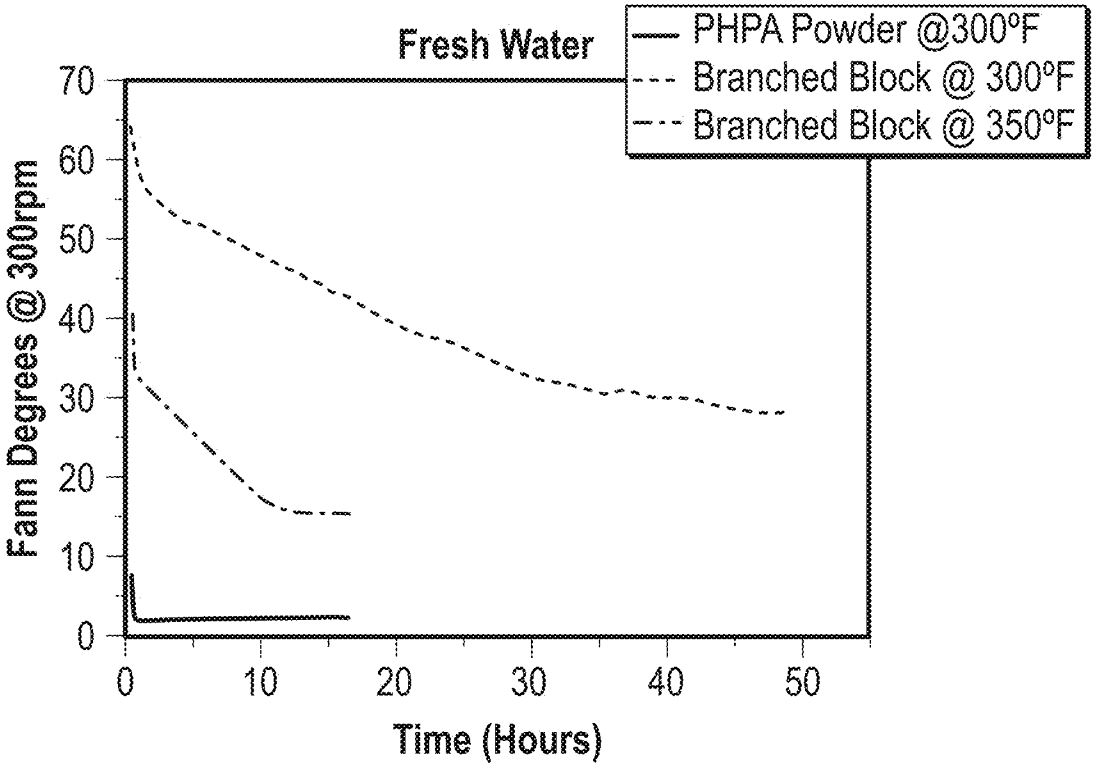
FIG. 7 illustrates rheological properties of the UHMW branched block copolymer according to one or more embodiments disclosed herein and commercial viscosifiers.

Shear degradation properties of the UHMW branched block copolymer at high temperature and pressure were also studied with powdered PHPA as a comparison using similar formulations, but in water. The results of which are illustrated in FIG. 7. The fluids for this study were prepared by adding the viscosifiers to water based on the formulation provided in Table 4, and adjusting the pH with caustic soda to pH 9-10. These fluids were then hot rolled for 16 hours at 120° F. before proceeding to shear testing with FANN® Model 77. The low temperature hot rolling ensured that minimum degradation was seen for powdered PHPA. FANN® Model 77 was then used to shear the fluids at 300 rpm at a temperature of 300° F. and a confined pressure of 10,000 psi. As seen in FIG. 7, both the UHMW branched block copolymer and PHPA powder underwent shear thinning initially. However, at 300° F., the PHPA powder (solid line) degrades to viscosity similar to water, but the UHMW branched block copolymer (dashed line) provided a much higher viscosity (seen as a higher dial reading) with reduced degradation. At 350° F., the UHMW branched block copolymer (dot-dash line) had a slight drop in viscosity compared to 300° F. due to increase in shear thinning at higher temperature. However, at 350° F. degradation is still minimized as the viscosity still remained high.

The superior performance seen in the branched block copolymer according to embodiments herein may be attributed to the branched block copolymer architecture of the polymer. In order to study the effects and rheological contributions of this UHMW branched block copolymer architecture (poly(acrylic acid)-block-poly(DMA-co-AMPS-co-MBA)), comparisons of the branched polymer according to embodiments herein with similar molecular weight linear block copolymer (poly(acrylic acid)-block-poly(DMA-co-AMPS)), random copolymer (poly(acrylic acid-co-DMA-co-AMPS)), random copolymer with no AA (poly(DMA-co-AMPS)), and commercial random copolymer with no AA (poly(DMA-co-AMPS)) or FRITZ FL-24 was carried out. Table 6 illustrates various formulations for water based muds with branched block copolymer with the different polymer architectures described above. The water based muds were mixed and hot rolled at 300° F. for 16 hours before rheological testing with FANN® Model 35.

TABLE 6

| Fluid formulations (lb/bbl): | Novel Branched Block Copolymer | Linear Block polymer | Random Copolymer | No AA random copolymer | FRITZ FL-24 |
|---|---|---|---|---|---|
| Water | 290.5 | 290.5 | 290.5 | 290.5 | 290.5 |
| MgO (pH buffer) | 4.5 | 4.5 | 4.5 | 4.5 | 4.5 |
| KCl | 8 | 8 | 8 | 8 | 8 |
| PAC-R | 0.5 | 0.5 | 0.5 | 0.5 | 0.5 |
| 2M g/mol Polymer | 3.25 | 3.25 | 3.25 | 3.25 | 3.25 |
| Barathin Plus | 3 | 3 | 3 | 3 | 3 |
| Barite | 191.9 | 191.9 | 191.9 | 191.9 | 191.9 |
| Density, lb/gal | 12 | 12 | 12 | 12 | 12 |
| Aging temp., ° F. | 300 | 300 | 300 | 300 | 300 |
| Aging conditions | rolling | rolling | rolling | rolling | rolling |

TABLE 6-continued

| Fluid formulations (lb/bbl): | Novel Branched Block Copolymer | Linear Block polymer | Random Copolymer | No AA random copolymer | FRITZ FL-24 |
|---|---|---|---|---|---|
| Aging period, hr | 16 | 16 | 16 | 16 | 16 |
| pH before aging | 9 | 9 | 10 | 9 | 10 |
| pH after aging | 7 | 7 | 8 | 8 | 8 |

Rheological testing of the compositions prepared in Table 6 were then carried out at 120° F. Table 7, below, illustrates the results. It can be seen that the UHMW branched block copolymer has superior rheological properties compared to unbranched block copolymers and random copolymers that are either synthesized in the lab or bought commercially, such as FRITZ FL-24. FANN® Model 35 data was measured at 120° F. for water based muds with different viscosifiers with different architectures after hot rolling at 300° F. for 16 hours.

TABLE 7

| FANN® Model 35 | Novel Branched Block Copolymer | Linear Block polymer | Random Copolymer | No AA random copolymer | FRITZ FL-24 |
|---|---|---|---|---|---|
| Temperature, ° F. | 120 | 120 | 120 | 120 | 120 |
| 600 rpm | 112 | 63 | 10 | 25 | 28 |
| 300 rpm | 75 | 39 | 6 | 13 | 13 |
| 200 rpm | 61 | 30 | 4 | 9 | 8 |
| 100 rpm | 45 | 18 | 2 | 4 | 3 |
| 6 rpm | 19 | 3 | 0 | 0 | 0 |

TABLE 7-continued

| FANN® Model 35 | Novel Branched Block Copolymer | Linear Block polymer | Random Copolymer | No AA random copolymer | FRITZ FL-24 |
|---|---|---|---|---|---|
| 3 rpm | 18 | 2 | 0 | 0 | 0 |
| 10 sec. gel, lb/100 ft2 | 19 | 3 | 1 | 1 | 0 |
| 10 min. gel, lb/100 ft2 | 33 | 5 | 2 | 2 | 1 |
| AV, cP | 56 | 32 | 5 | 13 | 14 |
| PV, cP | 37 | 24 | 4 | 12 | 15 |
| YP, lb/100 ft2 | 38 | 15 | 2 | 1 | 0 |
| Settling Observations | No Barite Settling | Barite Settling | Barite Settling | Barite Settling | Barite Settling |

TABLE 8

| Fluid formulations (lb/bbl): | | | | | | | | | | |
|---|---|---|---|---|---|---|---|---|---|---|
| Water | 276.5 | | 276.5 | | 276.5 | | 276.5 | | 276.5 | |
| MgO (pH buffer) | 4.5 | | 4.5 | | 4.5 | | 4.5 | | 4.5 | |
| KCl | 8 | | 8 | | 8 | | 8 | | 8 | |
| Novel Branched Block Copolymer | 2 | | — | | — | | — | | — | |
| EvoVis | — | | 2 | | 4 | | — | | — | |
| EZ-MUD | — | | — | | — | | 7 | | — | |
| POLY-PLUS RD | — | | — | | — | | — | | 4 | |
| Thinner | 3 | | 3 | | 3 | | 3 | | 3 | |
| Barite | 311 | | 311 | | 311 | | 311 | | 311 | |
| Clay | 2 | | 2 | | 2 | | 2 | | 2 | |
| Fluid Loss Additive | 2 | | 2 | | 2 | | 2 | | 2 | |
| Mud Density, lb/gal | 14 | | 14 | | 14 | | 14 | | 14 | |
| Aging temp., ° F. | 300 | | 300 | | 300 | | 300 | | 300 | |
| Aging conditions | rolling | | rolling | | rolling | | rolling | | rolling | |
| Aging period, hr | 16 | | 16 | | 16 | | 16 | | 16 | |
| pH before aging | 9.8 | | 9.9 | | 10.065 | | 10.1 | | 10 | |
| pH after aging | 7.89 | | 9.9 | | 8.03 | | 8.6 | | 8.6 | |
| Fann 35 | | | | | | | | | | |
| Temperature, ° F. | 120 | | 120 | | 120 | | 120 | | 120 | |
| 600 rpm | 126 | 125 | 67 | 83 | 113 | 123 | 87 | 30 | 124 | 56 |
| 300 rpm | 77 | 79 | 38 | 46 | 67 | 73 | 50 | 16 | 78 | 30 |
| 200 rpm | 58 | 62 | 27 | 32 | 49 | 52 | 35 | 11 | 57 | 21 |
| 100 rpm | 37 | 44 | 14 | 17 | 27 | 29 | 19 | 6 | 33 | 11 |
| 6 rpm | 8 | 15 | 2 | 1 | 3 | 3 | 2 | 1 | 3 | 1 |
| 3 rpm | 6 | 12 | 1 | 1 | 2 | 2 | 1 | 1 | 2 | 1 |
| 10 sec. gel, lb/100 ft2 | 6 | 12 | 2 | 1 | 3 | 2 | 2 | 1 | 3 | 2 |
| 10 min. gel, lb/100 ft2 | 8 | 23 | 2 | 2 | 3 | 3 | 2 | 1 | 4 | 4 |
| AV, cP | 63 | 63 | 34 | 42 | 57 | 62 | 44 | 15 | 62 | 28 |
| PV, cP | 49 | 46 | 29 | 37 | 46 | 50 | 37 | 14 | 46 | 26 |
| YP, lb/100 ft2 | 28 | 33 | 9 | 9 | 21 | 23 | 13 | 2 | 32 | 4 |
| Settling Observations | No Barite Settling | | Barite Setling | | Barite Setling | | Barite Setling | | Barite Setling | |

As seen in Table 8, viscosifiers using the UHMW branched block copolymer disclosed herein is compared to conventional EvoVis, EZ-MUD, and POLY-PLUS RD. The amount of water (in lb/bbl) of water, pH buffer, and KCl is held constant among each formulation. As seen, even at low addition rates (2 lb/bbl of the UHMW branched block copolymer disclosed herein vs. up to 7 lb/bbl of conventional additives) no barite settling is observed with the viscosifier as disclosed herein.

Advantageously, viscosity and gel formation for the UHMW branched block copolymer according to embodiments herein is superior at every speed over similar compositions of linear block polymer, random copolymer, no AA random copolymer and FRITZ FL-24. Further, AV, PV, YP are all suerior for the branched block copolymer according to embodiments herein as compared to other viscosifying agents, as are gel strength. Finally, the UHMW branched block copolymer according to embodiments herein does not exhibit barite settling at high temperatures, unlike conventional viscosifying agents. Such temperatures may be a lower limit of 300° F., 350° F., 400° F., 450° F., and an upper limit of 350° F., 400° F., 450° F., or 500° F., for example, where any lower limit may be combined with any upper limit.

Drilling Fluid Compositions

The UHMW branched block copolymer according to embodiments herein may be used in drilling fluids for use in wellbore operations. The drilling fluid may include a base fluid and one or more additives, such as UHMW branched block copolymer viscosifiers as described above, pH buffers, weighting materials, solid-phase components, thinners, fluid-loss control additives, alkali compounds, sodium sulfite, starch, and/or combinations thereof.

The drilling fluid composition may have an amount of the base fluid sufficient to enable the drilling fluid composition to be circulated to the drill bit at the bottom of a wellbore and back to the surface. The drilling fluid composition may include from 20 wt. % to 99 wt. % base fluid based on the total weight of the drilling fluid composition. For example, the drilling fluid composition may have from 20 wt. % to 80 wt. %, from 20 wt. % to 70 wt. %, from 20 wt. % to 60 wt. %, from 20 wt. % to 50 wt. %, from 20 wt. % to 40 wt. %, from 23 wt. % to 99 wt. %, from 23 wt. % to 80 wt. %, from 23 wt. % to 70 wt. %, from 23 wt. % to 60 wt. %, from 23 wt. % to 50 wt. %, from 23 wt. % to 40 wt. %, from 24 wt. % to 99 wt. %, from 24 wt. % to 80 wt. %, from 24 wt. % to 70 wt. %, from 24 wt. % to 60 wt. %, from 24 wt. % to 50 wt. %, from 24 wt. % to 40 wt. %, from 25 wt. % to 99 wt. %, from 25 wt. % to 80 wt. %, from 25 wt. % to 70 wt. %, from 25 wt. % to 60 wt. %, from 25 wt. % to 50 wt. %, or from 25 wt. % to 40 wt. % base fluid based on the total weight of the drilling fluid composition.

Alternatively, the drilling fluid composition may include from 170 pounds of mass per barrel of oil (lbm/bbl) to 340 lbm/bbl base fluid based on the total volume of the drilling fluid composition. For example, in embodiments, the drilling fluid composition may have from 170 lbm/bbl to 330 lbm/bbl, from 170 lbm/bbl to 310 lbm/bbl, from 170 lbm/bbl to 280 lbm/bbl, from 170 lbm/bbl to 250 lbm/bbl, from 170 lbm bbl to 220 lbm/bbl, from 170 lbm/bbl to 210 lbm/bbl, from 185 lbm/bbl to 340 lbm/bbl, from 185 lbm/bbl to 330 lbm/bbl, from 185 lbm/bbl to 310 lbm/bbl, from 185 lbm/bbl to 280 lbm/bbl, from 185 lbm/bbl to 250 lbm/bbl, from 185 lbm·bbl to 220 lbm/bbl, from 200 lbm/bbl to 340 lbm/bbl, from 200 lbm/bbl to 330 lbm/bbl, from 200 lbm/bbl to 310 lbm/bbl, from 200 lbm/bbl to 280 lbm/bbl, from 200 lbm/bbl to 250 lbm/bbl, from 210 lbm/bbl to 340 lbm/bbl, from 210 lbm/bbl to 330 lbm/bbl, from 210 lbm/bbl to 310 lbm/bbl, from 210 lbm/bbl to 280 lbm/bbl, from 210 lbm/bbl to 250 lbm/bbl, from 220 lbm·bbl to 340 lbm/bbl, from 220 lbm/bbl to 330 lbm/bbl, from 220 lbm/bbl to 310 lbm/bbl, from 220 lbm/bbl to 280 lbm/bbl, from 250 lbm/bbl to 340 lbm/bbl, or from 250 lbm/bbl to 310 lbm/bbl base fluid based on the total volume of the drilling fluid composition. In embodiments, the drilling fluid composition may have from 20 wt. % to 50 wt. % base fluid based on the total weight of the drilling fluid composition. In other embodiments, the drilling fluid composition may have from 25 wt. % to 50 wt. % base fluid based on the total weight of the drilling fluid composition.

In embodiments, the drilling fluid composition may include a weighting material. In some embodiments, the weighting material may be a particulate solid having a specific gravity (SG) sufficient to increase the density of the drilling fluid composition by a certain amount without adding so much weighting material that the drilling fluid composition cannot be circulated through the wellbore. The weighting material may have a specific gravity (SG) of from 2 grams per cubic centimeter (g/cm3) to 6 g/cm3. Examples of weighting materials include, but are not limited to, barite (minimum SG of 4.20 g/cm3), hematite (minimum SG of 5.05 g/cm3), calcium carbonate (minimum SG of 2.7-2.8 g/cm3), siderite (minimum SG of 3.8 g/cm3), ilmenite (minimum SG of 4.6 g/cm3), other weighting materials, or any combination of these weighting materials. Some example drilling fluid compositions may include barite as the solid.

The drilling fluid composition may include a weight percent of weighting material sufficient to increase the density of the drilling fluid composition to allow the drilling fluid composition to support the wellbore and prevent fluids in downhole formations from flowing into the wellbore. In embodiments, the drilling fluid composition may include from 1 wt. % to 80 wt. % weighting material based on the total weight of the drilling fluid composition. In some embodiments, the drilling fluid composition may include from 1 wt. % to 75 wt. %, from 1 wt. % to 74 wt. %, from 1 wt. % to 73 wt. %, from 1 wt. % to 70 wt. %, from 1 wt. % to 60 wt. %, from 20 wt. % to 80 wt. %, from 20 wt. % to 75 wt. %, from 20 wt. % to 74 wt. %, from 20 wt. % to 73 wt. %, from 20 wt. % to 70 wt. %, from 20 wt. % to 60 wt. %, from 50 wt. % to 80 wt. %, from 50 wt. % to 75 wt. %, from 50 wt. % to 74 wt. %, from 50 wt. % to 73 wt. %, from 50 wt. % to 70 wt. %, from 50 wt. % to 60 wt. %, from 60 wt. % to 80 wt. %, or from 60 wt. % to 75 wt. % weighting material based on the total weight of the drilling fluid composition.

In some embodiments, the drilling fluid composition may include from 2 lbm/bbl to 750 lbm/bbl weighting material based on the total volume of the drilling fluid composition. In some embodiments, the drilling fluid composition may include from 2 lbm/bbl to 650 lbm/bbl, from 2 lbm/bbl to 550 lbm/bbl, from 2 lbm/bbl to 450 lbm/bbl, from 2 lbm/bbl to 300 lbm/bbl, from 50 lbm/bbl to 750 lbm/bbl, from 50 lbm/bbl to 650 lbm/bbl, from 50 lbm/bbl to 550 lbm/bbl, from 50 lbm/bbl to 450 lbm/bbl, from 50 lbm/bbl to 300 lbm/bbl, from 100 lbm/bbl to 750 lbm/bbl, from 100 lbm/bbl to 650 lbm/bbl, from 100 1 bm/bbl to 550 lbm/bbl, from 100 1 bm/bbl to 450 lbm/bbl, from 100 lbm/bbl to 300 lbm/bbl, from 300 lbm/bbl to 750 lbm/bbl, or from 300 lbm/bbl to 650 lbm/bbl weighting material, based on the total volume of the drilling fluid composition.

The drilling fluid composition may include at least one solid-phase component. Examples of solid-phase components in the drilling fluid compositions may include, but are not limited to, the weighting materials, starch, soda ash, bentonite, lime, sodium sulfite, other solid-phase component, or combinations of these solid-phase components. All of the solid-phase components together make up a total solids content of the drilling fluid composition. In some embodiments, the drilling fluid composition may have a total solids content of equal to or greater than 50 wt. % based on the total weight of the drilling fluid composition. Alternatively, in other embodiments, the drilling fluid composition may have a solids content of equal to or greater than 60 wt. % based on the total weight of the drilling fluid composition.

The drilling fluid compositions may optionally include one or a plurality of additives to enhance the properties and characteristics of the drilling fluid composition. Examples of the additives include, but are not limited to, thinners, fluid-loss control additives, alkali compounds, or combinations of these. The drilling fluid composition may also optionally include pH buffers, electrolytes, glycols, glycerols, dispersion aids, corrosion inhibitors, defoamers, and other additives or combinations of additives.

For example, the drilling fluid composition may include at least one pH adjuster. In embodiments, the drilling fluid composition may optionally include at least one alkali compound. Examples of alkali compounds may include, but are not limited to, lime (calcium hydroxide, calcium oxide, or a mixture of both), soda ash (sodium carbonate), sodium hydroxide, potassium hydroxide, other strong bases, or combinations of these alkali compounds. The alkali compounds may react with gases, such as $CO_2$ or $H_2S$ for example, encountered by the drilling fluid composition during drilling operations to prevent the gases from hydrolyzing components of the drilling fluid composition. Some example drilling fluid compositions may optionally include from 0.01 wt. % to 0.7 wt. % soda ash. In other embodiments, the drilling fluid composition may optionally include from 0.01 wt. % to 0.5 wt. %, from 0.01 wt. % to 0.3 wt. %, from 0.01 wt. % to 0.1 wt. %, from 0.01 wt. % to 0.05 wt. %, from 0.05 wt. % to 0.7 wt. %, from 0.05 wt. % to 0.5 wt. %, from 0.05 wt. % to 0.3 wt. %, from 0.05 wt. % to 0.1 wt. %, from 0.1 wt. % to 0.7 wt. %, from 0.1 wt. % to 0.5 wt. %, from 0.1 wt. % to 0.3 wt. %, from 0.3 wt. % to 0.7 wt. %, from 0.3 wt. % to 0.5 wt. %, or from 0.5 wt. % to 0.7 wt. % soda ash, based on the total weight of the drilling fluid composition. Some example drilling fluid compositions may optionally include from 0.1 lbm/bbl to 10 lbm/bbl soda ash, based on the total volume of the drilling fluid composition.

In other embodiments, the drilling fluid composition may optionally include from 0.1 lbm/bbl to 8 lbm/bbl, from 0.1 lbm/bbl to 6 lbm/bbl, from 0.1 lbm/bbl to 4 lbm/bbl, from 1 lbm/bbl to 10 lbm/bbl, from 1 lbm/bbl to 8 lbm/bbl, from 1 lbm/bbl to 6 lbm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl soda ash, based on the total volume of the drilling fluid composition. Other example drilling fluid compositions may optionally include from 0.01 wt. % to 3 wt. % lime. In other embodiments, the drilling fluid composition may optionally include from 0.01 wt. % to 2 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 3 wt. %, from 0.05 wt. % to 2 wt. %, from 0.05 wt. % to 1 wt. %, from 0.05 wt. % to 0.5 wt. %, from 0.05 wt. % to 0.1 wt. %, from 0.1 wt. % to 3 wt. %, from 0.1 wt. % to 2 wt. %, from 0.1 wt. % to 1 wt. %, from 0.1 wt. % to 0.5 wt. %, from 0.5 wt. % to 3 wt. %, from 0.5 wt. % to 2 wt. %, from 0.5 wt. % to 1 wt. %, from 1 wt. % to 3 wt. %, from 1 wt. % to 2 wt. %, or from 2 wt. % to 3 wt. % lime, based on the total weight of the drilling fluid composition. In other examples, the drilling fluid compositions may optionally include from 0.1 lbm/bbl to 10 lbm/bbl lime, based on the total volume of the drilling fluid composition. In other embodiments, the drilling fluid composition may optionally include from 0.1 lbm/bbl to 8 lbm/bbl, from 0.1 lbm/bbl to 6 lbm/bbl, from 0.1 lbm/bbl to 4 lbm/bbl, from 1 lbm/bbl to 10 lbm/bbl, from 1 lbm/bbl to 8 lbm/bbl, from 1 lbm/bbl to 6 1 bm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl lime, based on the total volume of the drilling fluid composition.

In embodiments, the drilling fluid composition may have a pH of from 9.5 to 12, 9.5 to 11.5, from 9.5 to 11, from 9.5 to 10.5, from 9.5 to 10, from 10 to 12, from 10 to 11.5, from 10 to 11, from 10 to 10.5, from 10.5 to 12, from 10.5 to 11.5, from 10.5 to 11, from 11 to 12, from 11 to 11.5, or from 11.5 to 12. In some embodiments, the drilling fluid composition may have a pH of from 9.5 to 10.5.

In some embodiments, the drilling fluid composition may optionally include from 0.01 wt. % to 3 wt. % sodium sulfite. In other embodiments, the drilling fluid composition may optionally include from 0.01 wt. % to 2 wt. %, from 0.01 wt. % to 1 wt. %, from 0.01 wt. % to 0.5 wt. %, from 0.01 wt. % to 0.1 wt. %, from 0.01 wt. % to 0.05 wt. %, from 0.05 wt. % to 3 wt. %, from 0.05 wt. % to 2 wt. %, from 0.05 wt. % to 1 wt. %, from 0.05 wt. % to 0.5 wt. %, from 0.05 wt. % to 0.1 wt. %, from 0.1 wt. % to 3 wt. %, from 0.1 wt. % to 2 wt. %, from 0.1 wt. % to 1 wt. %, from 0.1 wt. % to 0.5 wt. %, from 0.5 wt. % to 3 wt. %, from 0.5 wt. % to 2 wt. %, from 0.5 wt. % to 1 wt. %, from 1 wt. % to 3 wt. %, from 1 wt. % to 2 wt. %, or from 2 wt. % to 3 wt. % sodium sulfite, based on the total weight of the drilling fluid composition.

In some embodiments, the drilling fluid composition may optionally include from 0.1 1 bm/bbl to 10 lbm/bbl sodium sulfite, based on the total volume of the drilling fluid composition. In other embodiments, the drilling fluid composition may optionally include from 0.1 lbm/bbl to 8 lbm/bbl, from 0.1 1 bm/bbl to 6 lbm/bbl, from 0.1 1 bm/bbl to 4 1 bm/bbl, from 1 lbm/bbl to 10 lbm/bbl, from 1 lbm/bbl to 8 lbm/bbl, from 1 lbm/bbl to 6 lbm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl sodium sulfite, based on the total volume of the drilling fluid composition.

In some embodiments, the drilling fluid composition may optionally include from 0.1 wt. % to 1 wt. % starch. In other embodiments, the drilling fluid composition may optionally include from 0.1 wt. % to 0.8 wt. %, from 0.1 wt. % to 0.6 wt. %, from 0.1 wt. % to 0.4 wt. %, from 0.2 wt. % to 1 wt. %, from 0.2 wt. % to 0.8 wt. %, from 0.2 wt. % to 0.6 wt. %, from 0.2 wt. % to 0.4 wt. %, from 0.4 wt. % to 1 wt. %, from 0.4 wt. % to 0.8 wt. %, from 0.4 wt. % to 0.6 wt. %, from 0.6 wt. % to 1 wt. %, or from 0.6 wt. % to 0.8 wt. % starch, based on the total weight of the drilling fluid composition. In some embodiments, the drilling fluid composition may optionally include from 0.1 lbm/bbl to 10 lbm/bbl starch, based on the total volume of the drilling fluid composition.

In other embodiments, the drilling fluid composition may optionally include from 0.1 lbm/bbl to 8 lbm/bbl, from 0.1 lbm/bbl to 6 lbm/bbl, from 0.1 lbm/bbl to 4 lbm/bbl, from 1 lbm/bbl to 10 lbm/bbl, from 1 lbm/bbl to 8 lbm/bbl, from 1 lbm/bbl to 6 lbm/bbl, from 1 lbm/bbl to 4 lbm/bbl, from 2 lbm/bbl to 10 lbm/bbl, from 2 lbm/bbl to 8 lbm/bbl, from 2 lbm/bbl to 6 lbm/bbl, from 2 lbm/bbl to 4 lbm/bbl, or from 4 lbm/bbl to 10 lbm/bbl starch, based on the total volume of the drilling fluid composition.

The drilling fluid composition may have a density of from 50 pounds of mass per cubic foot (lbm/ft3) to 160 lbm/ft3, from 50 lbm/ft3 to 150 lbm/ft3, from 50 lbm/ft3 to 140 lbm/ft3, from 50 lbm/ft3 to 130 lbm/ft3, from 50 lbm/ft3 to 120 lbm/ft3, from 50 lbm/ft3 to 110 lbm/ft3, from 50 lbm/ft3 to 90 lbm/ft3, from 90 lbm/ft3 to 160 lbm/ft3, from 90 lbm/ft3 to 150 lbm/ft3, 90 lbm/ft3 to 140 lbm/ft3, from 90 lbm/ft3 to 130 lbm/ft3, from 90 lbm/ft3 to 120 lbm/ft3, from 90 lbm/ft3 to 110 lbm/ft3, from 110 lbm/ft3 to 160 lbm/ft3, from 110 lbm/ft3 to 150 lbm/ft3, from 110 lbm/ft3 to 140 lbm/ft3, from 110 lbm/ft3 to 130 lbm/ft3, from 110 lbm/ft3 to 120 lbm/ft3, from 120 lbm/ft3 to 160 lbm/ft3, from 120 lbm/ft3 to 150 lbm/ft3, or from 120 lbm/ft3 to 140 lbm/ft3, where 1 lbm/ft3 is approximately 16.02 kilograms per cubic meter (kg/m3). Some example drilling fluid compositions may have a density that is equal to or greater than 70 lbm/ft3 (1,121 kg/m3). Other example drilling fluid compositions may have a density that is equal to or greater than 100 lbm/ft3 (1,602 kg/m3). Still other example drilling fluid compositions may have a density that is equal to or greater than 120 lbm/ft3 (1,922 kg/m3). Still other example drilling fluid compositions may have a density of from 120 lbm/ft3 (1,922 kg/m3) to 160 lbm/ft3 (2,563 kg/m3).

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A drilling fluid composition comprising:

a base fluid; and a viscosifier comprising a branched multi-block polymer having the following structure,

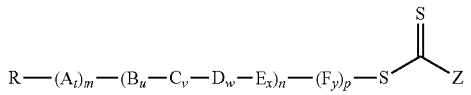

where “Z” is selected from the group consisting of a hydrogen, chlorine, sulfur, oxygen, a substituted or unsubstituted alkyl or substituted or unsubstituted aryl radical, a substituted or unsubstituted heterocycle, a substituted or unsubstituted alkylthio radical, a substituted or unsubstituted arylthio radical, a substituted or unsubstituted alkylselenium radical, a substituted or unsubstituted arylselenium radical, a substituted or unsubstituted alkoxy radical, a substituted or unsubstituted aryloxy radical, a substituted or unsubstituted amino radical, a substituted or unsubstituted hydrazine radical, a substituted or unsubstituted alkoxycarbonyl radical, a substituted or unsubstituted aryloxycarbonyl radical, a substituted or unsubstituted acycloxy or carboxyl radical, a substituted or unsubstituted aroyloxy radical, a substituted or unsubstituted carbamoyl radical, a cyano radical, a dialkyl- or diarylphosphonato radical, a dialkyl-phosphinato or diaryl-phosphinato radical, and a polymer chain;

where “R” is a substituted or unsubstituted alkyl, a substituted or unsubstituted acyl, a substituted or unsubstituted aryl, a substituted or unsubstituted aralkyl, a substituted or unsubstituted alkenyl or a substituted or unsubstituted alkynyl group; a saturated or unsaturated aromatic, a substituted or unsubstituted carbocycle or a substituted or unsubstituted heterocycle or a polymer chain, where the polymer chain is hydrophilic;

where “A” is selected from the group consisting of (meth)acrylate monomer units carrying a COOH or COO— group, fumaric acid or monoethylenically unsaturated C4-C10 and C4-C6 dicarboxylic acid monoesters, ((meth)acrylate/(meth)acrylamide) units having phosphate, phosphonate or phosphinate groups, and sulfonic acid or sulfonate functional group;

“B” is selected from the group consisting of (meth) acrylate monomer units carrying a COOH or COO— group, unsaturated C4-C10 and C4-C6 dicarboxylic acid monoesters, and ((meth)acrylate/(meth)acrylamide) units having phosphate, phosphonate or phosphinate groups, sulfonic acid or sulfonate functional groups;

“C” is selected from the group consisting of acrylamide, meth(acrylate) and meth(acrylamide) monomers with ammonium groups, meth(acrylate) and meth(acrylamide) with C20-C30 alkane diols or poly(ethylene glycol), 2-chloroethyl(meth)acrylate, tetrahydrofurfuryl acrylate, vinylacetamide, vinylpyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, and N-vinyl-7-ethyl-2-caprolactam;

“D” being selected from the group consisting of vinyl aromatic, (meth)acrylate, and (meth)acrylamide crosslinkers;

“E” being selected from the group consisting of alkyl (meth)acrylate monomer having C2-C40-alkyl esters of acrylic acid, C1-C40-alkyl esters of methacrylic acid, vinyl aromatics, fluorinated alkyl (meth)acrylates, and vinyl aromatic units; and “F” being any monomer, or combination of monomers for monomers “A” –“E”;

where “t” is from 3-500 units, “u”, “v”, and “w” are from 3-260000 units, “x”, and “y” are from 0-260000 units, “m” and “n” are from 1-10 units, and “p” is from 0-10 units, where at least one of “x” and “y” are not equal to 0, and when “y” is not equal to 0 “p” is not equal to 0.

2. The composition of claim 1, wherein the COOH or COO— group comprises one or more selected from the group consisting of acrylic acid, methacrylic acid, ethacrylic acid, a-chloroacrylic acid, crotonic acid, maleic acid, itaconic acid, citraconic acid, mesaconic acid, glutaconic acid, and aconitic acid.

3. The composition of claim 1, wherein the fumaric acid or monoethylenically unsaturated C4-C10 and C4-C6 dicarboxylic acid monoesters comprises monomethyl maleate.

4. The composition of claim 1, wherein the ((meth) acrylate/(meth)acrylamide) units having phosphate, phosphonate or phosphinate groups comprises one or more selected from the group consisting of 2-acrylamido-ethylphosphonic acid (AEPA), monoacryloyloxyethyl phosphate or bis(2-methacryloyloxyethyl)phosphate units, vinylphosphonic acid, allylphosphonic acid, isopropylphosphonic acid, diallylaminomethylene phosphonate and their salts.

5. The composition of claim 1, wherein the sulfonic acid or sulfonate functional group comprises one or more selected from the group consisting of 3-sulfopropyl (meth) acrylate, 2-propene-1-sulfonic acid, sodium-1-allyloxy-2 hydroxypropylsulfonate (COPS1), 2-acrylamido-2-methylpropanesulfonic acid (AMPS), (meth)allyl sulfonate, sodium vinylsulfonate, and sodium styrenesulfonate.

6. The composition of claim 1, wherein the acrylamide comprises one or more selected from the group consisting of N,N-(Dimethyl acrylamide) (DMA), (meth)acrylamide, morpholine N-oxide acrylamide, N,N-dimethyl (meth)acrylamide, N,N-diethylacrylamide, (meth)acrylamide, N-isopropyl (meth)acrylamide, N-tert-butyl (meth)acrylamide, and diacetone acrylamide, meth(acrylate) and meth(acrylamide) monomers with ammonium groups selected from group consisting of N,N-dimethylaminomethyl (meth)acrylate, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate and N,N-dimethylaminocyclohexyl (meth)acrylate; N-[2-(dimethylamino)ethyl](meth)acrylamide, N-[3-(dimethylamino) propyl](meth)acrylamide, N-[4-(dimethylamino)butyl] (meth)acrylamide, N-[2-(diethylamino)ethyl](meth)acrylamide, and N-[4-(dimethylamino)cyclohexyl](meth)acrylamide, [2-((Meth)acryloyloxy)ethyl]trimethylammonium chloride, N-(3-Sulfopropyl)-N-(meth)acroyloxyethyl-N,N-dimethylammonium betaine, N-(3-sulfopropyl)-N-methacroylamidepropyl-N,N-dimethylammonium betaine, N-(3-carboxymethyl)-N-methacroylamidepropyl-N,N-dimethylammonium betaine, and N-carboxymethyl-N-methacroyloxyethyl-N,N dimethylammonium betaine, and meth (acrylate) and meth (acrylamide) with C20-C30 alkane diols or poly(ethylene glycol) monomer selected from group consisting of 2-hydroxyethyl (meth)acrylate, 2-hydroxypropyl (meth)acrylate, 3-hydroxypropyl (meth)acrylate, 3-hydroxybutyl (meth)acrylate, 4-hydroxybutyl (meth)acrylate, 6-hydroxyhexyl(meth)acrylate, 3-hydroxy-2-ethylhexyl (meth)acrylate, N-(hydroxymethyl) acrylamide, N-(2-hydroxypropyl) methacrylamide, N-hydroxyethylacrylamide, N-[tris(hydroxymethyl) methacrylamide, 4-acryloylmorpholine, 2-N-morpholinoethyl methacrylate, (meth)acrylate of polyethylene glycol, (meth)acrylate of diethylene glycol, ethylene glycol methyl ether (meth)acrylate, poly(propylene glycol) acrylate, 2-chloroethyl(meth)acrylate, and tetrahydrofurfuryl acrylate.

7. The composition of claim 1, wherein the vinyl aromatic, (meth)acrylate, and (meth)acrylamide crosslinkers comprises one or more selected from the group consisting of N,N-methylenebisacrylamide, bis(2-methacryloyl)oxyethyl disulfide, 1,4-Bis(4-vinylphenoxy) butane, divinyl benzene, ethylene glycol di(meth)acrylate, diethylene glycol di(meth) acrylate, tetra(ethylene glycol) diacrylate triethylene glycol dimethacrylate, poly(ethylene glycol)di(meth)acrylate with a number average molecular weight of Mn=250-20000 g/mol, neopentyl glycol diacrylate, neopentyl glycol propoxylate diacrylate, and tri (propylene glycol) diacrylate.

8. The composition of claim 1, wherein the alkyl (meth) acrylate monomer having C2-C40-alkyl esters of acrylic acid, C1-C40-alkyl esters of methacrylic acid, vinyl aromatics, and fluorinated alkyl (meth)acrylates comprises one or more selected from the group consisting of methyl (meth) acrylate, ethyl (meth)acrylate, N-propyl (meth)acrylate, isopropyl (meth)acrylate, N-butyl (meth)acrylate, isobutyl (meth)acrylate, tert-butyl (meth)acrylate, pentyl(meth)acrylate, N-hexyl(meth)acrylate, N-heptyl(meth)acrylate, N-octyl(meth)acrylate, 2-ethylhexyl (meth)acrylate, decyl(meth) acrylate, lauryl (meth)acrylate, palmityl(meth)acrylate, stearyl (meth)acrylate, hydrenol (meth)acrylate, behenyl (meth)acrylate, polyisobutene (meth)acrylate, and phenoxyethyl (meth)acrylate.

9. The composition of claim 1, wherein the vinyl aromatic units comprises one or more selected from the group consisting of styrene, phenyl (meth)acrylate, benzyl (meth) acrylate, 4-acetoxystyrene, 4-bromostyrene, 2,4-dimethylstyrene, 2,5-dimethylstyrene, 3,5-dimethylstyrene, 4-ethoxystyrene, 4-tert-butystyrene, 2-chlorostyrene, 3-chlorostyrene, 4-chlorostyrene, 4-ethoxystyrene, 4-fluorostyrene, 2,6-dichlorostyrene, 4-methoxystyrene, methylstyrene, 3-methylstyrene, 4-methylstyrene, and 2,4,6-trimethylstyrene.

* * * * *